(12) United States Patent
Liu et al.

(10) Patent No.: US 12,254,351 B2
(45) Date of Patent: Mar. 18, 2025

(54) COMPUTER-IMPLEMENTED METHOD IN A SYSTEM COMPRISING ONE OR MORE PROCESSORS FOR EXECUTING PERIODIC TASKS, SYSTEM COMPRISING ONE OR MORE PROCESSORS FOR EXECUTING PERIODIC TASKS, AND COMPUTER-PROGRAM PRODUCT

(71) Applicant: BOE Technology Group Co., Ltd., Beijing (CN)

(72) Inventors: Cheng Liu, Beijing (CN); Hongtao Guan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/762,344

(22) PCT Filed: May 31, 2021

(86) PCT No.: PCT/CN2021/097320
§ 371 (c)(1),
(2) Date: Mar. 21, 2022

(87) PCT Pub. No.: WO2022/252026
PCT Pub. Date: Dec. 8, 2022

(65) Prior Publication Data
US 2024/0045720 A1   Feb. 8, 2024

(51) Int. Cl.
*G06F 9/48* (2006.01)

(52) U.S. Cl.
CPC .............................. *G06F 9/4887* (2013.01)

(58) Field of Classification Search
CPC ...................................................... G06F 9/4887
See application file for complete search history.

(56) References Cited

U.S. PATENT DOCUMENTS

| 10,754,706 B1* | 8/2020 | Mo ........................ G06F 9/5038 |
| 2005/0034126 A1 | 2/2005 | Moore |
| 2009/0031319 A1 | 1/2009 | Fecioru |
| 2011/0209152 A1 | 8/2011 | Camps Mur et al. |
| 2013/0055276 A1 | 2/2013 | Park et al. |

(Continued)

FOREIGN PATENT DOCUMENTS

| CN | 103793272 B | 5/2014 |
| CN | 104699533 A | 6/2015 |

(Continued)

OTHER PUBLICATIONS

International Search Report & Written Opinion mailed Feb. 25, 2022, regarding PCT/CN2021/097320.

(Continued)

*Primary Examiner* — Sisley N Kim
(74) *Attorney, Agent, or Firm* — Intellectual Valley Law, P.C.

(57) ABSTRACT

A computer-implemented method in a system having one or more processors for executing periodic tasks is provided. The computer-implemented method includes classifying the periodic tasks into one of at least two groups including a first group and a second group. Cycle times of first periodic tasks in the first group respectively are one or more integer divisors of a maximum cycle time.

19 Claims, 8 Drawing Sheets

(56) References Cited

U.S. PATENT DOCUMENTS

| | | | |
|---|---|---|---|
| 2015/0074674 A1 | 3/2015 | Ma et al. | |
| 2017/0123850 A1* | 5/2017 | Nakazawa | G06F 9/4881 |
| 2018/0039514 A1 | 2/2018 | Liao et al. | |
| 2021/0117280 A1* | 4/2021 | Tang | G06F 11/1469 |
| 2021/0282034 A1* | 9/2021 | Hwang | H04L 1/0036 |
| 2023/0418667 A1* | 12/2023 | Lee | G06F 9/4881 |

FOREIGN PATENT DOCUMENTS

| | | |
|---|---|---|
| CN | 104735795 B | 6/2015 |
| CN | 106383744 A | 2/2017 |
| CN | 107846732 B | 3/2018 |
| CN | 109716298 A | 5/2019 |
| CN | 110209482 A | 9/2019 |
| CN | 111813553 A | 10/2020 |
| CN | 112799821 A | 5/2021 |
| WO | 2015051387 A1 | 4/2015 |
| WO | 2018050242 A1 | 3/2018 |

OTHER PUBLICATIONS

Chen, "Design of Real-Time Virtual Resource Architecture for Embedded System", Master Degree Thesis, Qunming Technology University, May 12, 2011, English Translation of Abstract attached.

\* cited by examiner

COMPUTER-IMPLEMENTED METHOD IN A SYSTEM COMPRISING ONE OR MORE PROCESSORS FOR EXECUTING PERIODIC TASKS, SYSTEM COMPRISING ONE OR MORE PROCESSORS FOR EXECUTING PERIODIC TASKS, AND COMPUTER-PROGRAM PRODUCT

CROSS-REFERENCE TO RELATED APPLICATION

This application is a national stage application under 35 U.S.C. § 371 of International Application No. PCT/CN2021/097320, filed May 31, 2021, the contents of which are incorporated by reference in the entirety.

TECHNICAL FIELD

The present invention relates to display technology, more particularly, to a computer-implemented method in a system comprising one or more processors for executing periodic tasks, a system comprising one or more processors for executing periodic tasks, and a computer-program product.

BACKGROUND

The main purpose of periodic task scheduling is to address the occupation of a shared computational resource by multiple periodic tasks. A shared computational resource can allow only one or more tasks to use it at the same time. Thus, periodic task scheduling becomes necessary when a total number of periodic tasks exceeds the number of periodic tasks allowed to use the shared computational resource at the same time.

SUMMARY

In one aspect, the present disclosure provides a computer-implemented method in a system comprising one or more processors for executing periodic tasks, comprising classifying the periodic tasks into one of at least two groups comprising a first group and a second group; wherein cycle times of first periodic tasks in the first group respectively are one or more integer divisors of a maximum cycle time.

Optionally, classifying the periodic tasks comprises classifying a periodic task into the first group upon a determination that a number of execution times of the periodic task is greater than a minimum number of execution times.

Optionally, classifying the periodic tasks comprises classifying a periodic task into the second group upon a determination that a number of execution times of the periodic task is equal to or less than a minimum number of execution times.

Optionally, the computer-implemented method further comprises determining whether or not there is a conflict between two periodic tasks; wherein, prior to determining the conflict, the computer-implemented method further comprises determining whether an actual execution duration per cycle of a respective periodic task is an integer multiplier of a minimum time slot; upon a determination that the actual execution duration per cycle of the respective periodic task is not an integer multiplier of the minimum time slot, rounding up the actual execution duration per cycle to an assigned integer multiplier of the minimum time slot; and assigning the assigned integer multiplier as a scheduling execution duration per cycle for purpose of determining the conflict; wherein the actual execution duration per cycle is used for executing the respective periodic task, and the scheduling execution duration per cycle is used for purpose of determining the conflict.

Optionally, the computer-implemented method further comprises forming a task queue comprising at least one periodic task; and assigning precedences respectively to periodic tasks in the task queue; wherein the task queue comprises an active task sub-queue and a waiting task sub-queue; precedences of periodic tasks in the active task sub-queue are higher than precedences of periodic tasks in the waiting task sub-queue; precedences of second periodic tasks in the second group are higher than precedences of the first periodic tasks in the first group; and precedences of periodic tasks in a same sub-queue and in a same group are ranked by priority.

Optionally, precedences of periodic tasks in a same sub-queue and in a same group and having a same priority are randomly ranked or ranked by task arriving time points.

Optionally, the computer-implemented method further comprises forming a task queue comprising at least one periodic task; and queueing a newly arrived periodic task of the first group; wherein queueing the newly arrived periodic task of the first group comprises determining whether or not a conflict exists between the newly arrived periodic task of the first group and any of periodic tasks of the first group in the task queue; and upon a determination the conflict exists between the newly arrived periodic task of the first group and the periodic tasks of the first group in the task queue, excluding a periodic task of the first group having a lowest priority from the task queue.

Optionally, the computer-implemented method further comprises reiterating determining conflict and excluding periodic task until no conflict exists between the newly arrived periodic task of the first group and any of periodic tasks of the first group in the task queue; and adding the newly arrived periodic task of the first group into the task queue; wherein periodic tasks of the first group in the task queue are ranked by priority.

Optionally, the computer-implemented method further comprises forming a task queue comprising at least one periodic task; and queueing a newly arrived periodic task of the first group; wherein queueing the newly arrived periodic task of the first group comprises determining whether or not a conflict exists between the newly arrived periodic task of the first group and any of periodic tasks of the first group in the task queue; and upon a determination no conflict exists between the newly arrived periodic task of the first group and any of the periodic tasks of the first group in the task queue, adding the newly arrived periodic task of the first group into the task queue; wherein periodic tasks of the first group in the task queue are ranked by priority.

Optionally, the computer-implemented method further comprises forming a task queue comprising at least one periodic task, the task queue comprising an active task sub-queue and a waiting task sub-queue; and queueing a newly arrived periodic task of the second group; wherein queueing the newly arrived periodic task of the second group comprises determining whether or not there is at least one periodic task in the waiting task sub-queue; and upon a determination there is at least one periodic task in the waiting task sub-queue, adding the newly arrived periodic task of the second group into the waiting task sub-queue.

Optionally, the newly arrived periodic task of the second group added into the waiting task sub-queue is assigned a precedence higher than any periodic task of the first group in the waiting task sub-queue; and periodic tasks of the second group in the waiting task sub-queue are ranked by priority.

Optionally, the computer-implemented method further comprises forming a task queue comprising at least one periodic task, the task queue comprising an active task sub-queue and a waiting task sub-queue; and queueing a newly arrived periodic task of the second group; wherein queueing the newly arrived periodic task of the second group comprises determining whether or not there is at least one periodic task in the waiting task sub-queue; upon a determination there is no periodic task in the waiting task sub-queue, determining whether or not a conflict exists between the newly arrived periodic task of the second group and any of periodic tasks in the active task sub-queue; and upon a determination there is no conflict between the newly arrived periodic task of the second group and any of periodic tasks in the active task sub-queue, adding the newly arrived periodic task of the second group into the active task sub-queue.

Optionally, the computer-implemented method further comprises forming a task queue comprising at least one periodic task, the task queue comprising an active task sub-queue and a waiting task sub-queue; and queueing a newly arrived periodic task of the second group; wherein queueing the newly arrived periodic task of the second group comprises determining whether or not there is at least one periodic task in the waiting task sub-queue; upon a determination there is no periodic task in the waiting task sub-queue, determining whether or not a conflict exists between the newly arrived periodic task of the second group and any of periodic tasks in the active task sub-queue; upon a determination a conflict exists between the newly arrived periodic task of the second group and periodic tasks in the active task sub-queue, determining whether or not there is at least one periodic task of the first group in the active task sub-queue; upon a determination there is at least one periodic task of the first group in the active task sub-queue, moving a periodic task of the first group in the active task sub-queue into the waiting task sub-queue; and subsequent to moving the periodic task of the first group in the active task sub-queue into the waiting task sub-queue, determining whether or not a conflict exists between the newly arrived periodic task of the second group and any of periodic tasks remaining in the active task sub-queue.

Optionally, the computer-implemented method further comprises, upon a determination no conflict exists between the newly arrived periodic task of the second group and any of periodic tasks remaining in the active task sub-queue subsequent to moving the periodic task of the first group in the active task sub-queue into the waiting task sub-queue, adding the newly arrived periodic task of the second group into the active task sub-queue.

Optionally, the computer-implemented method further comprises, upon a determination there is a conflict between the newly arrived periodic task of the second group and any of periodic tasks remaining in the active task sub-queue subsequent to moving the periodic task of the first group in the active task sub-queue into the waiting task sub-queue, adding the newly arrived periodic task of the second group into the waiting task sub-queue.

Optionally, the computer-implemented method further comprises forming a task queue comprising at least one periodic task, the task queue comprising an active task sub-queue and a waiting task sub-queue; and updating the task queue periodically respectively at scheduled time points, wherein, at a respective scheduled time point, updating the task queue comprises determining whether the periodic task with the highest precedence in the waiting task sub-queue is a periodic task of the first group; upon a determination the periodic task with the highest precedence in the waiting task sub-queue is a periodic task of the first group, determining whether there is a conflict between a periodic task with a highest precedence in the waiting task sub-queue and any periodic task in the active task sub-queue; and upon a determination no conflict exists between the periodic task with the highest precedence in the waiting task sub-queue and any periodic task in the active task sub-queue, adding the periodic task with the highest precedence in the waiting task sub-queue into the active task sub-queue.

Optionally, the computer-implemented method further comprises forming a task queue comprising at least one periodic task, the task queue comprising an active task sub-queue and a waiting task sub-queue; and updating the task queue periodically respectively at scheduled time points; wherein the periodic task with the highest precedence in the waiting task sub-queue is a periodic task of the second group; wherein, at a respective scheduled time point, updating the task queue comprises determining whether the periodic task with the highest precedence in the waiting task sub-queue is a periodic task of the second group; upon a determination the periodic task with the highest precedence in the waiting task sub-queue is a periodic task of the second group, determining whether there is any periodic task in the active task sub-queue having a remaining number of execution times equal to zero; upon a determination there is a periodic task in the active task sub-queue having the remaining number of execution times equal to zero, removing the periodic task in the active task sub-queue having the remaining number of execution times equal to zero from the active task sub-queue; determining whether there is a conflict between the periodic task with the highest precedence in the waiting task sub-queue and any periodic task remaining in the active task sub-queue; and upon a determination no conflict exists between the periodic task with the highest precedence in the waiting task sub-queue and any periodic task in the active task sub-queue, adding the periodic task with the highest precedence in the waiting task sub-queue into the active task sub-queue.

Optionally, the computer-implemented method further comprises reiterating, sequentially one-by-one according to an order of precedence, determining conflict and adding periodic task for remaining periodic tasks in the waiting task sub-queue, until a conflict is determined.

Optionally, the computer-implemented method further comprises forming a task queue comprising at least one periodic task, the task queue comprising an active task sub-queue and a waiting task sub-queue; and updating the task queue periodically respectively at scheduled time points; wherein, at a respective scheduled time point, updating the task queue comprises determining whether a periodic task with a highest precedence in the waiting task sub-queue is a periodic task of the second group; upon a determination the periodic task with the highest precedence in the waiting task sub-queue is a periodic task of the second group, determining whether there is any periodic task in the active task sub-queue having a remaining number of execution times equal to zero; and upon a determination none of periodic tasks in the active task sub-queue having the remaining number of execution times equal to zero, maintaining the periodic task with the highest precedence in the waiting task sub-queue in the waiting task sub-queue.

Optionally, the computer-implemented method further comprises determining whether or not there is a conflict between a newly arrived periodic task of the second group and one or more existing periodic tasks of the second group; wherein determining the conflict comprises traversing selective values of time slots available between a present time and a starting time point of a last scheduling execution period of any of the one or more existing periodic tasks of the second group, as candidate initial starting time points of the newly arrived periodic task of the second group, to determine whether or not there is any overlap between candidate scheduling execution periods of the newly arrived periodic task of the second group having a respective candidate initial starting time point and scheduling execution periods of any of the one or more existing periodic tasks of the second group; wherein the selective values of time slots exclude any value that renders an initial starting time point or a time point at an end time point of first scheduling execution period of the newly arrived periodic task of the second group to be within any scheduling execution period of any of the one or more existing periodic tasks of the second group; wherein determining whether or not there is any overlap comprises, upon a determination any candidate scheduling execution period of the newly arrived periodic task of the second group in a present round of traversal is the same as any candidate scheduling execution period of the newly arrived periodic task of the second group in any previous round of traversal, determining there is an overlap in the present round of traversal; wherein any existing periodic task of the second group having an initial starting time point later than an end time point of the newly arrived periodic task of the second group, or an end time point earlier than a candidate initial starting time point of the newly arrived periodic task of the second group is not traversed in a respective round of traversal; and wherein a respective round of traversal is terminated once an overlap between a candidate scheduling execution period of the newly arrived periodic task of the second group and a scheduling execution period of one of the one or more existing periodic tasks of the second group is determined for the first time.

Optionally, the computer-implemented method further comprises determining whether or not there is a conflict between a newly arrived periodic task of the second group and one or more existing periodic tasks of the first group; wherein determining the conflict comprises obtaining a minimum common divisor of durations of scheduling execution periods of the one or more existing periodic tasks of the first group; and limited in a traversing period having a duration twice of the minimum common divisor, traversing selective values of time slots available in traversing period, as candidate initial starting time points of the newly arrived periodic task of the second group, to determine whether or not there is any overlap between candidate scheduling execution periods of the newly arrived periodic task of the second group having a respective candidate initial starting time point and scheduling execution periods of any of the one or more existing periodic tasks of the first group.

Optionally, the computer-implemented method further comprises determining whether or not there is a conflict between a newly arrived periodic task of the second group and one or more existing periodic tasks of the first group; wherein scheduling execution periods of a respective one of the one or more existing periodic tasks of the first group is expressed as $[(\varphi_i+kT_i), (\varphi_i+kT_i+\tau_i)]$, $k=0, 1, 2, \ldots, N_i$; wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks; wherein scheduling execution periods of the newly arrived periodic task of the second group is expressed as $[(\varphi^N+kT^N),(\varphi^N+kT^N+\tau^N)]$, $k=0, 1, 2, \ldots, N^N$; wherein $\varphi_N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task; wherein determining the conflict comprises performing a remainder value calculation to obtain modified scheduling execution periods $[(\varphi^N+kT^N) \bmod T_i, (\varphi^N+kT^N+\tau^N) \bmod T_i]$, $k=0, 1, 2, \ldots, N^N$; and using the modified scheduling execution periods for determining the conflict.

Optionally, the computer-implemented method further comprises determining whether or not there is a conflict between a newly arrived periodic task of the first group and one or more existing periodic tasks of the second group; wherein determining the conflict comprises obtaining a minimum common divisor of durations of scheduling execution periods of newly added and existing periodic tasks of the first group; and limited in a traversing period having a duration twice of the minimum common divisor, traversing selective values of time slots available in traversing period, as candidate initial starting time points of the newly arrived periodic task of the first group, to determine whether or not there is any overlap between candidate scheduling execution periods of the newly arrived periodic task of the first group having a respective candidate initial starting time point and scheduling execution periods of any of the one or more existing periodic tasks of the second group.

Optionally, the computer-implemented method further comprises determining whether or not there is a conflict between a newly arrived periodic task of the first group and one or more existing periodic tasks of the second group; wherein scheduling execution periods of a respective one of the one or more existing periodic tasks of the second group is expressed as $[(\varphi_i+kT_i),(\varphi_i+kT_i+\tau_i)]$, $k=0, 1, 2, \ldots, N_i$; wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks; wherein scheduling execution periods of the newly arrived periodic task of the first group is expressed as $[(\varphi^N+kT^N), (\varphi^N+kT^N+\tau^N)]$, $k=0, 1, 2, \ldots, N^N$; wherein $\varphi^N$ stands for an initial starting time period, before a first scheduling execution period starts, of the newly arrived periodic task. $T^N$ stands for a cycle time of the newly arrived periodic task, $T^N$ stands for a scheduling execution duration per cycle of the newly arrived periodic task, and $N^N$ stands for a maximum number of execution times of the newly arrived periodic task; wherein determining the conflict comprises performing a remainder value calculation to obtain modified scheduling execution periods $[(\varphi^N+kT^N) \bmod T_i, (\varphi^N+kT^N+\tau^N) \bmod T_i]$, $k=0, 1, 2, \ldots, N^N$; and using the modified scheduling execution periods for determining the conflict.

Optionally, the computer-implemented method further comprises determining whether or not there is a conflict between a newly arrived periodic task of the first group and one or more existing periodic tasks of the first group; wherein determining the conflict comprises obtaining a minimum common divisor of durations of scheduling execution periods of newly added and existing periodic tasks of the first group; and limited in a traversing period having a duration of the minimum common divisor, traversing selective values of time slots available in traversing period, as candidate initial starting time points of the newly arrived periodic task of the first group, to determine whether or not there is any overlap between candidate scheduling execution periods of the newly arrived periodic task of the first group having a respective candidate initial starting time point and scheduling execution periods of any of the one or more existing periodic tasks of the first group.

Optionally, the computer-implemented method further comprises determining whether or not there is a conflict between a newly arrived periodic task and one or more existing periodic tasks; wherein determining the conflict comprises traversing selective values of time slots available as candidate initial starting time points of the newly arrived periodic task, to determine whether or not there is any overlap between candidate scheduling execution periods of the newly arrived periodic task having a respective candidate initial starting time point and scheduling execution periods of any of the one or more existing periodic tasks; wherein the computer-implemented method further comprises, upon a determination that any overlap between any candidate scheduling execution period of the newly arrived periodic task and a scheduling execution period of any of the one or more existing periodic tasks is within a tolerance range, adjusting candidate scheduling execution period that overlaps with the scheduling execution period of the one or more existing periodic tasks so that any overlap is avoided.

In another aspect, the present disclosure provides a system comprising one or more processors for executing periodic tasks, comprising a memory; one or more processors; wherein the memory and the one or more processors are connected with each other; and the memory stores computer-executable instructions for controlling the one or more processors to classify the periodic tasks into one of at least two groups comprising a first group and a second group; wherein cycle times of first periodic tasks in the first group respectively are one or more integer divisors of a maximum cycle time.

In another aspect, the present disclosure provides a computer-program product comprising a non-transitory tangible computer-readable medium having computer-readable instructions thereon, the computer-readable instructions being executable by a processor to cause the processor to perform classifying periodic tasks into one of at least two groups comprising a first group and a second group; wherein cycle times of first periodic tasks in the first group respectively are one or more integer divisors of a maximum cycle time.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a computer-implemented method in a system comprising one or more processors for executing periodic tasks, a system comprising one or more processors for executing periodic tasks, and a computer-program product that substantially obviate one or more of the problems due to limitations and disadvantages of the related art. In one aspect, the present disclosure provides a computer-implemented method in a system comprising one or more processors for executing periodic tasks. In some embodiments, the computer-implemented method includes classifying the periodic tasks into one of at least two groups comprising a first group and a second group. Optionally, cycle times of first periodic tasks in the first group respectively are one or more integer divisors of a maximum cycle time.

Figure 1:
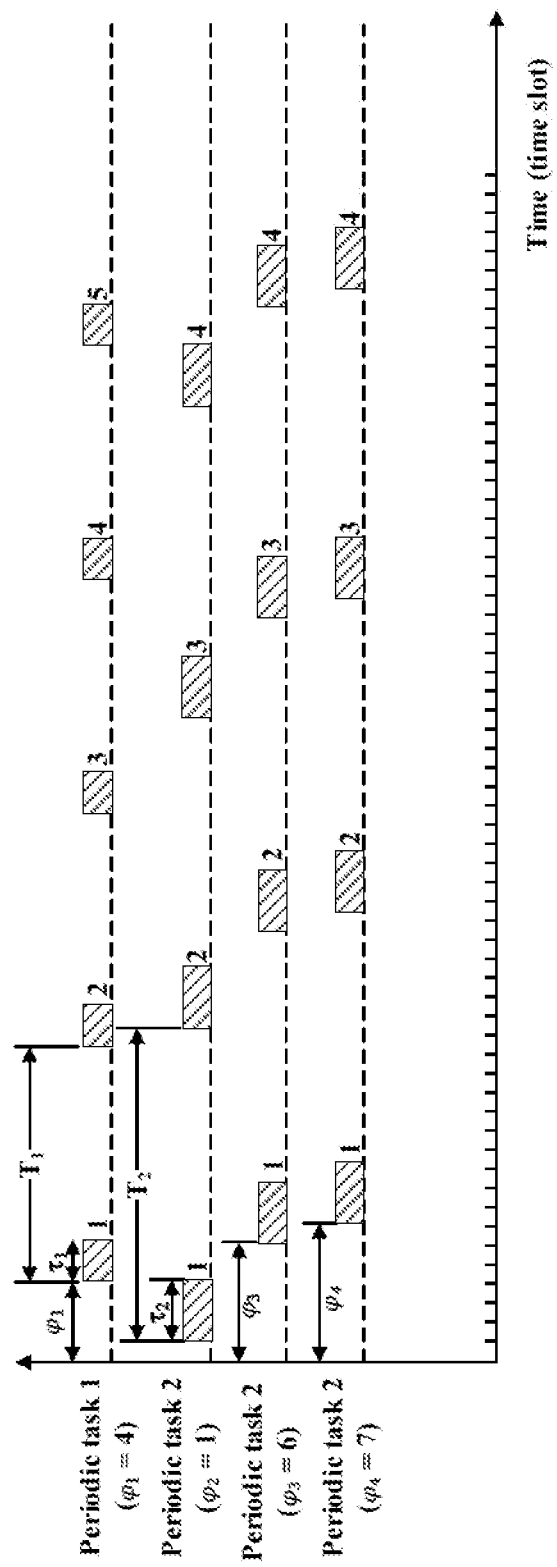
FIG. 1 illustrates an example of scheduling multiple periodic tasks in some embodiments according to the present disclosure.

FIG. 1 illustrates an example of scheduling multiple periodic tasks in some embodiments according to the present disclosure. Referring to FIG. 1, multiple periodic tasks are scheduled over time. The unit for the "Time" axis may be a time slot. In one example, the time slot may be defined as one or more milli-seconds, for example, 1 milli-second, 10 milli-seconds, 50 milli-seconds, 100 milli-seconds, or 1000 milli-seconds. Optionally, the time slot is defined as 100 milli-seconds.

A periodic task may be characterized by multiple parameters, for example, cycle time T, execution duration per cycle $\tau$, a number of execution times N, and an initial starting time period $\varphi$. The cycle time T and the initial starting time period $\varphi$ may be integers. Referring to FIG. 1, the periodic task 1 has a cycle time $T_1$, an execution duration per cycle $\tau_1$, a number of execution times equals to 5, and an initial starting time period $\varphi_1$. In one example, the cycle time $T_1$ equals to 12 time slots. In another example, a time slot equals to 100 milli-seconds, and the cycle time $T_1$ equals to 1200 milli-seconds.

Referring to FIG. 1, at time slot 0, a periodic task 2 arrives. A first execution duration per cycle $\tau_1$ starts at time slot #4. In one example, the method checks whether or not executing the periodic task 2 at time slot #1 would cause any conflict with the periodic task 1, e.g., setting an initial starting time period $\varphi_2$ of the periodic task 2 to be 1 time slot. As shown in FIG. 1, a conflict is found when the initial starting time period $\varphi_2$ of the periodic task 2 is set to be 1 time slot.

The computer-implemented method then checks whether or not executing the periodic task 2 at the end of the first execution duration per cycle of the periodic task 1 would cause any conflict with the periodic task 1, e.g., setting an initial starting time period 92 of the periodic task 2 to be 6 time slot. As shown in FIG. 1, a conflict is still found when the initial starting time period $\varphi_2$ of the periodic task 2 is set to be 6 time slots.

The computer-implemented method then checks whether or not executing the periodic task 2 with an initial starting time period $\varphi_2$ set to be 7 time slots would cause any conflict with the periodic task 1. As shown in FIG. 1, no conflict is found when the initial starting time period $\varphi_2$ of the periodic task 2 is set to be 7 time slots. Accordingly, the periodic task 2 can be scheduled with the initial starting time period $\sim_2$ set to be 7 time slots.

In some embodiments, the present system for executing periodic tasks includes a task control module for storing relevant information of periodic tasks such as cycle time T, execution duration per cycle $\tau$, a number of execution times N, and an initial starting time period $\varphi$. Each task control module is associated with a respective periodic task.

In some embodiments, the computer-implemented method includes forming a task queue comprising at least one periodic task. In one example, the task queue includes an active task sub-queue and a waiting task sub-queue. The periodic tasks that are being actively executed (already started) are placed in the active task sub-queue. The periodic tasks that have not started are placed in the waiting task sub-queue. The task queue, including the active task sub-queue and the waiting task sub-queue can be updated. In one example, the task queue is updated when a new periodic task arrives. In another example, the task queue can be updated periodically respectively at scheduled time points. In another example, the task queue can be updated per each time slot in a synchronous manner. In another example, the task queue can be updated every time an execution status of a task undergoes a change.

Figure 2A:
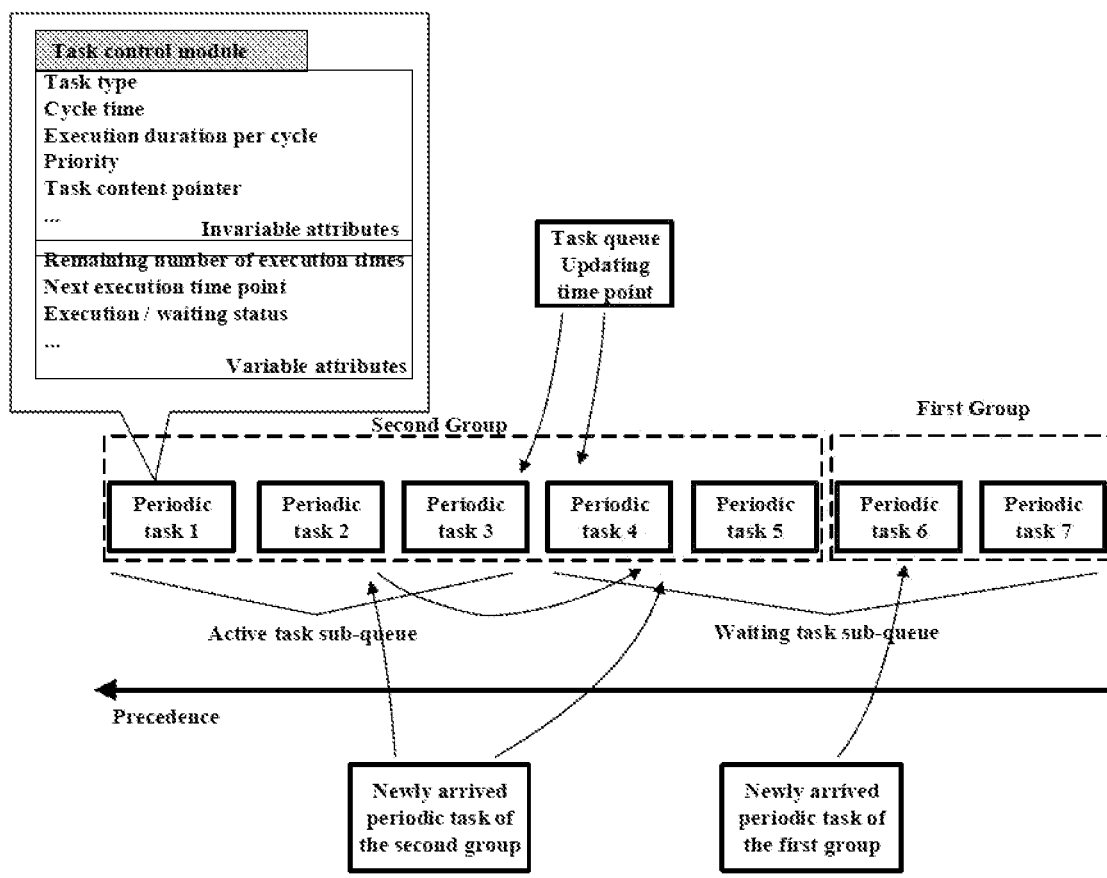
FIG. 2A illustrates a computer-implemented method for executing periodic tasks in some embodiments according to the present disclosure.

FIG. 2A illustrates a computer-implemented method for executing periodic tasks in some embodiments according to the present disclosure. Referring to FIG. 2A, the computer-implemented method in some embodiments includes classifying the periodic tasks into one of at least two groups comprising a first group and a second group. Optionally, a periodic task is classified into the first group upon a determination that a number of execution times of the periodic task is greater than a minimum number of execution times M. Optionally, M is a number equal to or greater than 10, e.g., 11, 12, 13, 14, 15, 16, 17, 18, 19, 20, 25, 30, or 35. In one example, a periodic task having an infinity number of execution times can be classified into the first group. In another example, a periodic task having a number of execution times greater than 10 can be classified into the first group. Optionally, a periodic task is classified into the second group upon a determination that a number of execution times of the periodic task is equal to or less than a minimum number of execution times. In one example, a periodic task having a number of execution times equal to or less than 10 can be classified into the second group.

In some embodiments, the present method requires that cycle times of first periodic tasks in the first group respectively are one or more integer divisors of a maximum cycle time. For example, the maximum cycle time may be set to 1260 time slots. Possible cycle times for the first periodic tasks in the first group include any product of any two or multiple numbers selected from 1, 2, 2, 3, 3, 5, and 7. In one example, the possible cycle times for the first periodic tasks in the first group include 1, 2, 3, 4, 5, 6, 7, 9, 10, 12, 15, 18, 20, 21, 24, 28, 30, 35, 36, 42, 45, 60, etc.

An actual execution duration per cycle of a periodic task may be an integer multiple of a time slot (e.g., 2 time slots), or a non-integer multiple of a time slot (e.g., 0.2 time slot). In some embodiments, the present method includes determining whether or not there is a conflict between two periodic tasks. In some embodiments, prior to determining the conflict, the present method further includes determining whether an actual execution duration per cycle of a respective periodic task is an integer multiplier of a minimum time slot. Optionally, upon a determination that the actual execution duration per cycle of the respective periodic task is an integer multiplier of the minimum time slot, the actual execution duration per cycle is used as a scheduling execution duration per cycle for purpose of determining the conflict. Optionally, upon a determination that the actual execution duration per cycle of the respective periodic task is not an integer multiplier of the minimum time slot, the computer-implemented method further includes rounding up the actual execution duration per cycle to an assigned integer multiplier of the minimum time slot; and assigning the assigned integer multiplier as a scheduling execution duration per cycle for purpose of determining the conflict. In one example, the actual execution duration per cycle is used for executing the respective periodic task, and the scheduling execution duration per cycle is used for purpose of determining the conflict.

Referring to FIG. 2A again, for each periodic task, the system comprising one or more processors for executing periodic tasks in some embodiments includes a task control module. The task control module stores information on various attributes of the periodic task, including invariable attributes and variable attributes. Examples of invariable attributes include task type, cycle time, execution duration per cycle, priority, task content pointer, and so on. Examples of variable attributes include remaining number of execution times, next execution time point, execution/waiting status, and so on. In one example, an initial value of the remaining number of execution times is equal to the number of execution times, which is reduced by one every time the periodic task is executed. When the remaining number of execution times is reduced to zero, the task control module for the periodic task is removed from the task queue. In another example, the next execution time point is a time point when the periodic task is to be executed next time. The value of the next execution time point is updated every cycle, for example, when the system starts to execute the periodic task or when the execution in a respective cycle is complete. In another example, execution/waiting status indicates whether the periodic task is in an active task sub-queue or in a waiting task sub-queue or in a to-be-removed sub-queue. When a periodic task is assigned a to-be-removed status, the system is configured to remove the periodic task from the task queue, e.g., due to its conflict with other periodic tasks.

FIG. 2A shows an example in which the task queue includes an active task sub-queue and a waiting task sub-queue. The computer-implemented method in some embodiments further includes assigning precedences respectively to periodic tasks in the task queue. As shown in FIG. 2A, the precedences of the periodic tasks increase from the right side to the left side. Precedences of periodic tasks in the active task sub-queue are higher than precedences of periodic tasks in the waiting task sub-queue. Precedences of second periodic tasks in the second group are higher than precedences of the first periodic tasks in the first group. In FIG. 2A, the second periodic tasks in the second group include periodic tasks 1 to 5, and the first periodic tasks in the first group include periodic tasks 6 to 7. Periodic tasks 1 to 3 are in the active task sub-queue, and periodic tasks 4 to 7 are in the waiting task sub-queue. As used herein, the term "precedence" refers to sequence in time by which the present system and method execute the periodic tasks. As used herein, the term "priority" refers to importance assigned to a periodic task. A periodic task having a relative higher priority (e.g., more important) does not necessarily has a higher precedence (e.g., to be executed earlier in time). The execution of the periodic tasks are ranked by the order of precedences, not by the order of priority. The order of precedences are affected by several factors, including status (active or waiting), task type (first group or second group), priority, etc.

In some embodiments, precedence of periodic tasks in a same sub-queue and in a same group are ranked by priority. For example, periodic tasks 1 to 3 are in the active task sub-queue and in the second group, precedence of periodic tasks 1 to 3 are ranked by their respective priority. Periodic tasks 6 to 7 are in the waiting task sub-queue and in the first group, precedence of periodic tasks 6 to 7 are ranked by their respective priority. Periodic tasks 4 to 5 are in the waiting task sub-queue and in the second group, precedence of periodic tasks 4 to 5 are ranked by their respective priority. Optionally, precedences of periodic tasks in a same sub-queue and in a same group and having a same priority are randomly ranked. Optionally, precedences of periodic tasks in a same sub-queue and in a same group and having a same priority are ranked by task arriving time points.

Figure 2B:
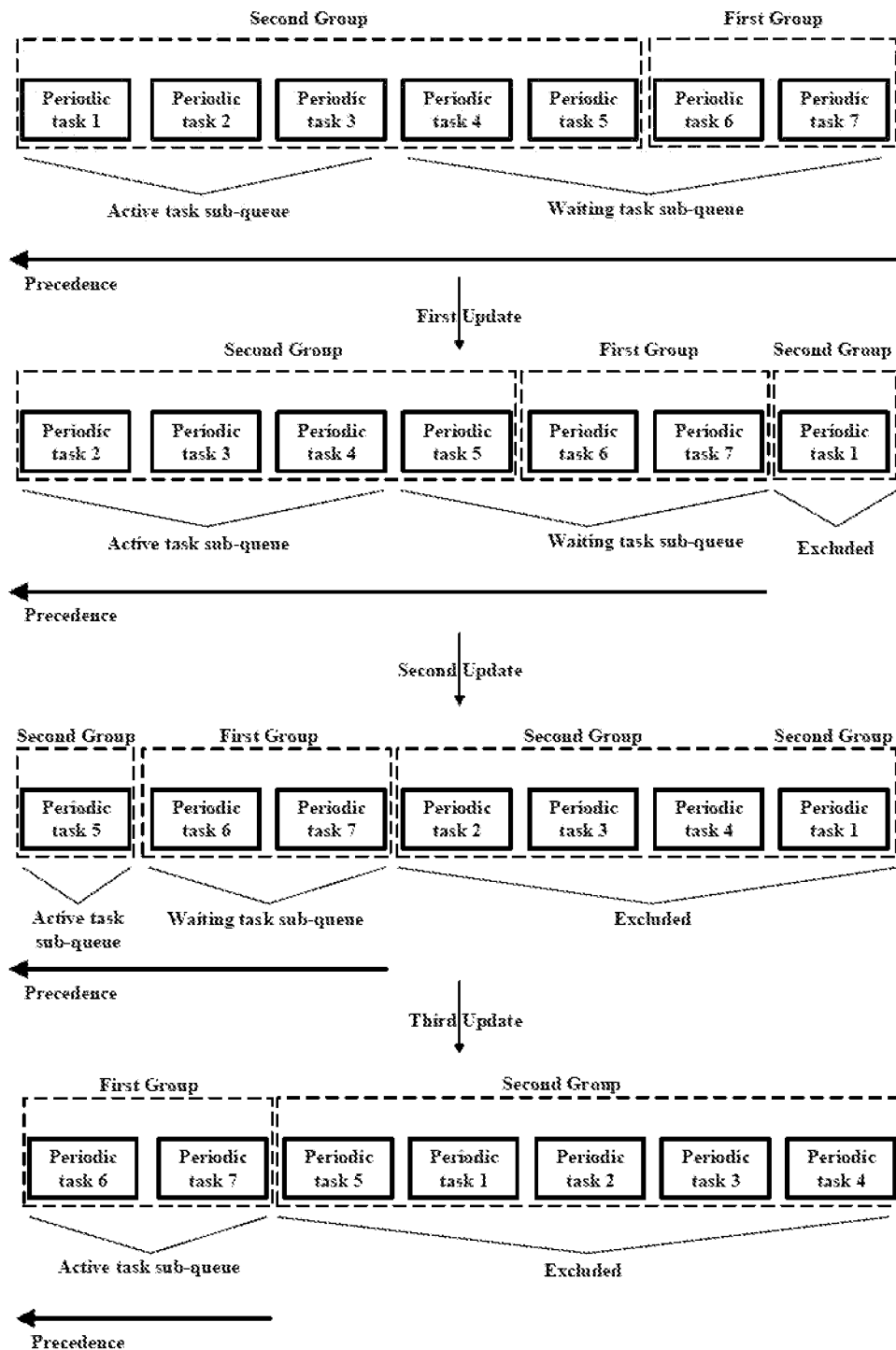
FIG. 2B illustrates a computer-implemented method for executing periodic tasks in some embodiments according to the present disclosure.

FIG. 2B illustrates a computer-implemented method for executing periodic tasks in some embodiments according to the present disclosure. Referring to FIG. 2B, for illustration, several examples of updates are shown in FIG. 2B, including "First Update," "Second Update." and "Third Update." Prior to the "First Update," and during execution of the periodic tasks, the remaining number of execution times of the periodic task 1 of the second group is reduced to zero, the periodic task 1 of the second group is moved to the to-be-removed task sub-queue, awaiting to be removed during next update (the "First Update"). Subsequent to the "First Update," the periodic task 1 of the second group is excluded from the task queue. The periodic task 4 of the second group is moved into the active task sub-queue. The periodic tasks 6 and 7 of the first group remain in the waiting task sub-queue. Prior to the "Second Update," and during execution of the periodic tasks, the remaining numbers of execution times of the periodic tasks 2, 3, and 4 of the second group are reduced to zero, the periodic tasks 2, 3, and 4 of the second group are moved to the to-be-removed task sub-queue, awaiting to be removed during next update (the "Second Update"). Subsequent to the "Second Update," the periodic tasks 2, 3, and 4 of the second group are also excluded from the task queue. The periodic task 5 of the second group is moved into the active task sub-queue. The periodic tasks 6 and 7 of the first group remain in the waiting task sub-queue. Prior to the "Third Update." and during execution of the periodic tasks, the remaining number of execution times of the periodic task 5 of the second group is reduced to zero, the periodic task 5 of the second group is moved to the to-be-removed task sub-queue, awaiting to be removed during next update (the "Third Update"). Subsequent to the "Third Update," the periodic task 5 of the second group is excluded from the task queue. The periodic tasks 6 and 7 of the first group are moved into the active task sub-queue. As illustrated in FIG. 2B, in some embodiments of the present computer-implemented method, precedences of second periodic tasks in the second group are always higher than precedences of the first periodic tasks in the first group. Optionally, the first periodic tasks in the first group remain in the waiting task sub-queue until all second periodic tasks in the second group have been executed (remaining numbers of execution times of which become zero), and excluded from the task queue.

In some embodiments, the computer-implemented method further includes forming a task queue comprising at least one periodic task; and queueing a newly arrived periodic task. In some embodiments, the first periodic tasks in the first group have no conflict among them.

Figure 3:
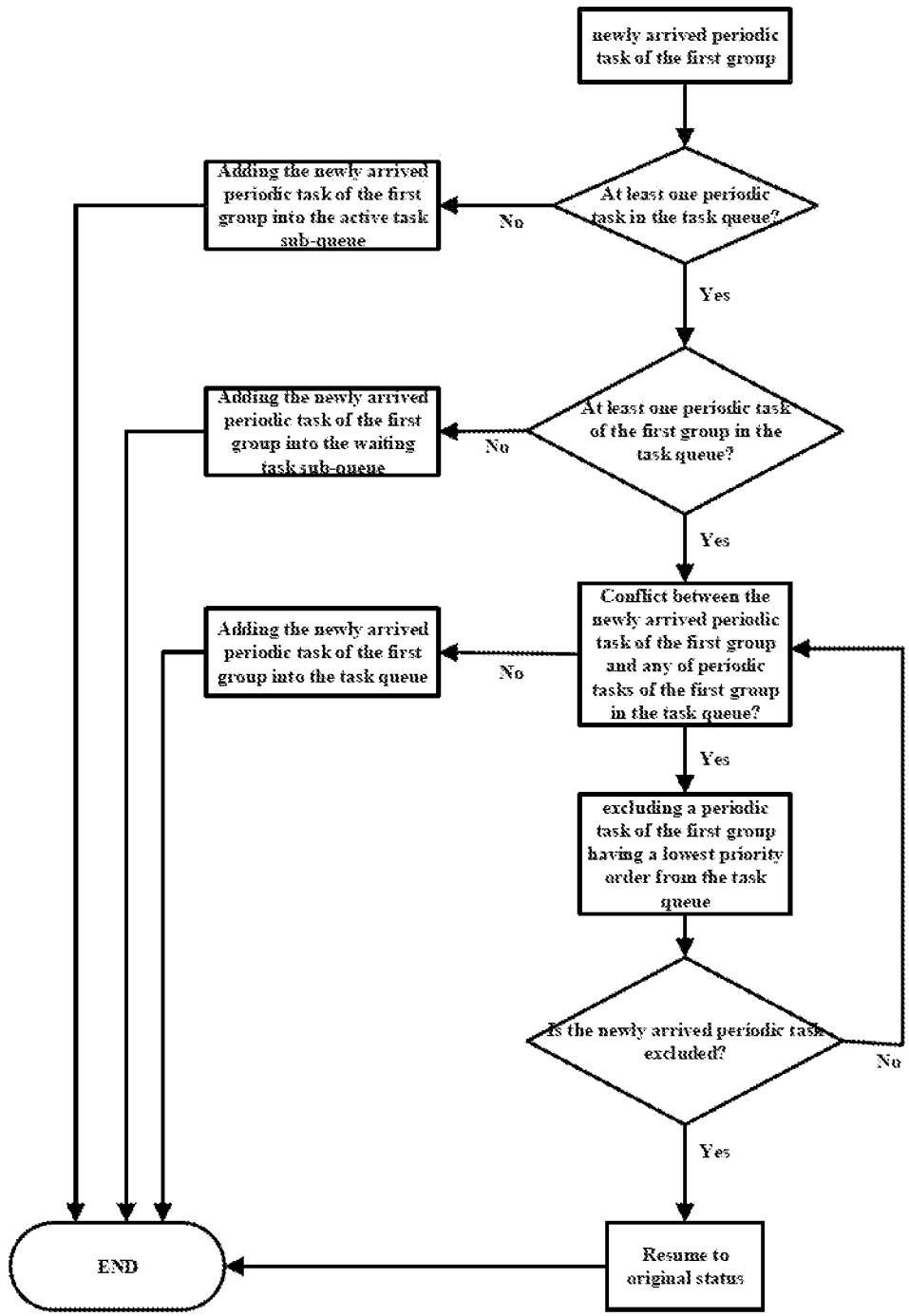
FIG. 3 is a flow chart illustrating a computer-implemented method in some embodiments according to the present disclosure.

In some embodiments, the newly arrived periodic task is a newly arrived periodic task of the first group. FIG. 3 is a flow chart illustrating a computer-implemented method in some embodiments according to the present disclosure. Referring to FIG. 3, the computer-implemented method in some embodiments includes determining whether there is at least one periodic task in the task queue. Upon a determination there is no periodic task in the task queue (e.g., an empty task queue), the computer-implemented method in some embodiments includes adding the newly arrived periodic task of the first group into the active task sub-queue.

Upon a determination there is at least one periodic task in the task queue, the computer-implemented method in some embodiments further includes determining whether there is at least one periodic task of the first group in the task queue. Upon a determination there is no periodic task of the first group in the task queue, the computer-implemented method in some embodiments further includes adding the newly arrived periodic task of the first group into the waiting task sub-queue.

Upon a determination there is at least one periodic task of the first group in the task queue, the computer-implemented method in some embodiments further includes determining whether or not a conflict exists between the newly arrived periodic task of the first group and any of periodic tasks of the first group in the task queue.

Upon a determination no conflict exists between the newly arrived periodic task of the first group and the periodic tasks of the first group in the task queue, the computer-implemented method in some embodiments further includes adding the newly arrived periodic task of the first group into the task queue. Periodic tasks of the first group in the task queue are ranked by priority. If two periodic tasks of the first group in the task queue have the same priority, they may be ranked randomly or ranked by task arriving time points.

Upon a determination the conflict exists between the newly arrived periodic task of the first group and the periodic tasks of the first group in the task queue, the computer-implemented method in some embodiments further includes excluding a periodic task of the first group having a lowest priority from the task queue. If the newly arrived periodic task of the first group is the task being excluded, the system resumes to the original status.

In some embodiment, according to the present computer-implemented method, there is no conflict among periodic tasks of the first group in the task queue as any potential conflict would be resolve when a newly arrived periodic task of the first group is considered. Accordingly, referring to FIG. 2B, the periodic tasks in the first group remain in the waiting task sub-queue until all periodic tasks in the second group have been executed, and excluded from the task queue. When multiple periodic tasks in the first group are moved from the waiting task sub-queue into the active task sub-queue, they are moved altogether because there is no conflict among them.

In some embodiments, upon a determination that the newly arrived periodic task of the first group is not the periodic task of the first group having a lowest priority, the computer-implemented method further includes reiterating determining conflict and excluding periodic task until no conflict exists between the newly arrived periodic task of the first group and any of periodic tasks of the first group in the task queue; and adding the newly arrived periodic task of the first group into the task queue. Periodic tasks of the first group in the task queue are ranked by priority. If two periodic tasks of the first group in the task queue have the same priority, they may be ranked randomly or ranked by task arriving time points.

Figure 4:
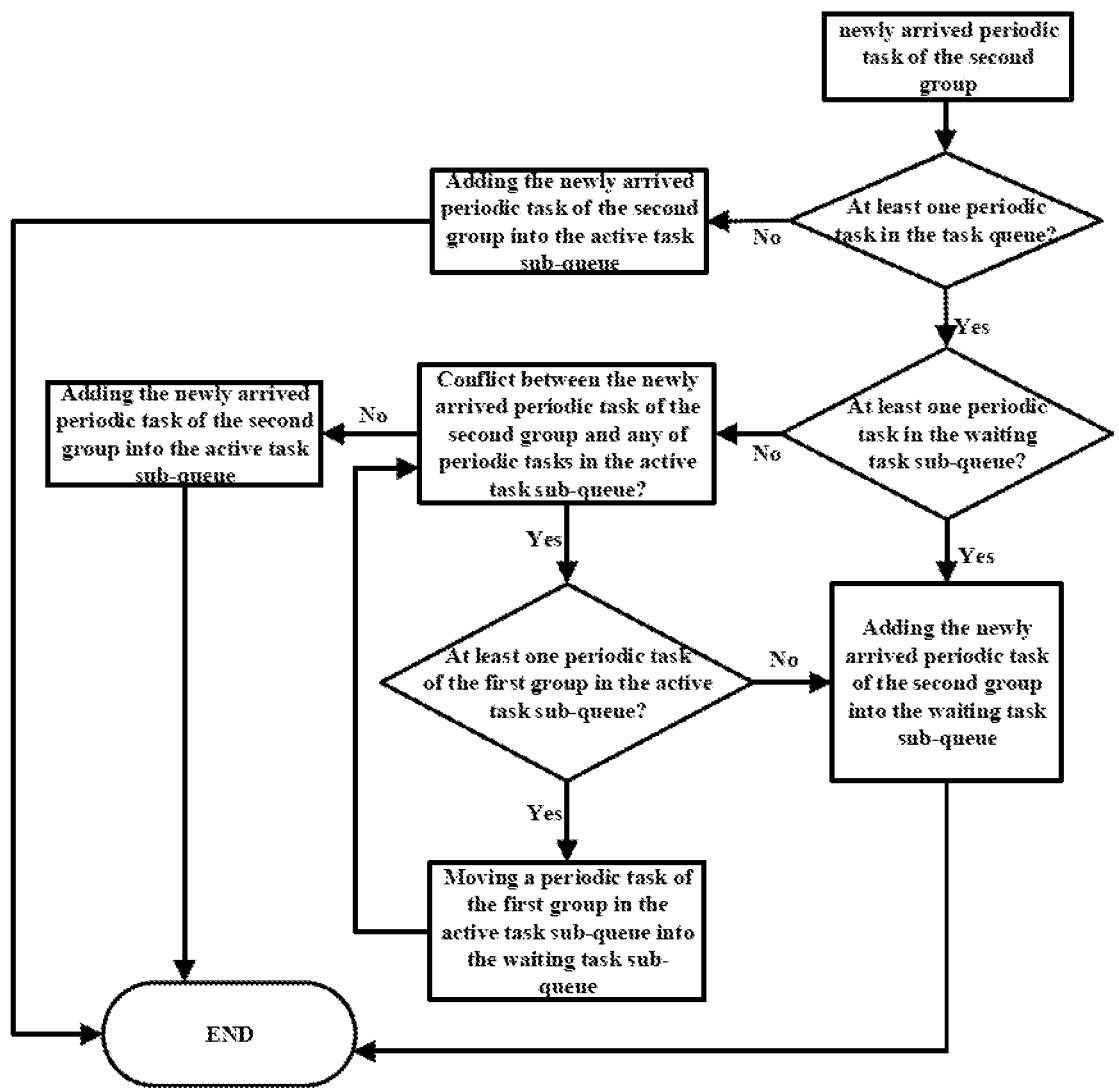
FIG. 4 is a flow chart illustrating a computer-implemented method in some embodiments according to the present disclosure.

In some embodiments, the newly arrived periodic task is a newly arrived periodic task of the second group. FIG. 4 is a flow chart illustrating a computer-implemented method in some embodiments according to the present disclosure. Referring to FIG. 4, the computer-implemented method in some embodiments includes determining whether there is at least one periodic task in the task queue. Upon a determination there is no periodic task in the task queue (e.g., an empty task queue), the computer-implemented method in some embodiments includes adding the newly arrived periodic task of the second group into the active task sub-queue.

Upon a determination there is at least one periodic task in the task queue, the computer-implemented method in some embodiments further includes determining whether there is at least one periodic task in the waiting task sub-queue. Upon a determination there is at least one periodic task in the waiting task sub-queue, the computer-implemented method in some embodiments further includes adding the newly arrived periodic task of the second group into the waiting task sub-queue. The newly arrived periodic task of the second group added into the waiting task sub-queue is assigned a precedence higher than any periodic task of the first group in the waiting task sub-queue. Optionally, periodic tasks of the second group in the waiting task sub-queue are ranked by priority. If two periodic tasks of the second group in the waiting task sub-queue have the same priority, they may be ranked randomly or ranked by task arriving time points.

Upon a determination there is no periodic task in the waiting task sub-queue, the computer-implemented method in some embodiments further includes determining whether or not a conflict exists between the newly arrived periodic task of the second group and any of periodic tasks in the active task sub-queue. Upon a determination there is no conflict between the newly arrived periodic task of the second group and any of periodic tasks in the active task sub-queue, the computer-implemented method in some embodiments further includes adding the newly arrived periodic task of the second group into the active task sub-queue.

Upon a determination a conflict exists between the newly arrived periodic task of the second group and periodic tasks in the active task sub-queue, the computer-implemented method in some embodiments further includes determining whether or not there is at least one periodic task of the first group in the active task sub-queue. Upon a determination there is no periodic task of the first group in the active task sub-queue, the computer-implemented method in some embodiments further includes adding the newly arrived periodic task of the second group into the waiting task sub-queue.

Upon a determination there is at least one periodic task of the first group in the active task sub-queue, the computer-implemented method in some embodiments further includes moving a periodic task of the first group in the active task sub-queue into the waiting task sub-queue. Subsequent to moving the periodic task of the first group in the active task sub-queue into the waiting task sub-queue, the computer-implemented method in some embodiments further includes determining whether or not a conflict exists between the newly arrived periodic task of the second group and any of periodic tasks remaining in the active task sub-queue.

Upon a determination no conflict exists between the newly arrived periodic task of the second group and any of periodic tasks remaining in the active task sub-queue subsequent to moving the periodic task of the first group in the active task sub-queue into the waiting task sub-queue, the computer-implemented method in some embodiments further includes adding the newly arrived periodic task of the second group into the active task sub-queue. Optionally, periodic tasks of the second group in the active task sub-queue are ranked by priority. If two periodic tasks of the second group in the active task sub-queue have the same priority, they may be ranked randomly or ranked by task arriving time points.

Upon a determination there is a conflict between the newly arrived periodic task of the second group and any of periodic tasks remaining in the active task sub-queue subsequent to moving the periodic task of the first group in the active task sub-queue into the waiting task sub-queue, the computer-implemented method in some embodiments further includes adding the newly arrived periodic task of the second group into the waiting task sub-queue. Optionally, periodic tasks of the second group in the waiting task sub-queue are ranked by priority. If two periodic tasks of the second group in the waiting task sub-queue have the same priority, they may be ranked randomly or ranked by task arriving time points.

Figure 5:
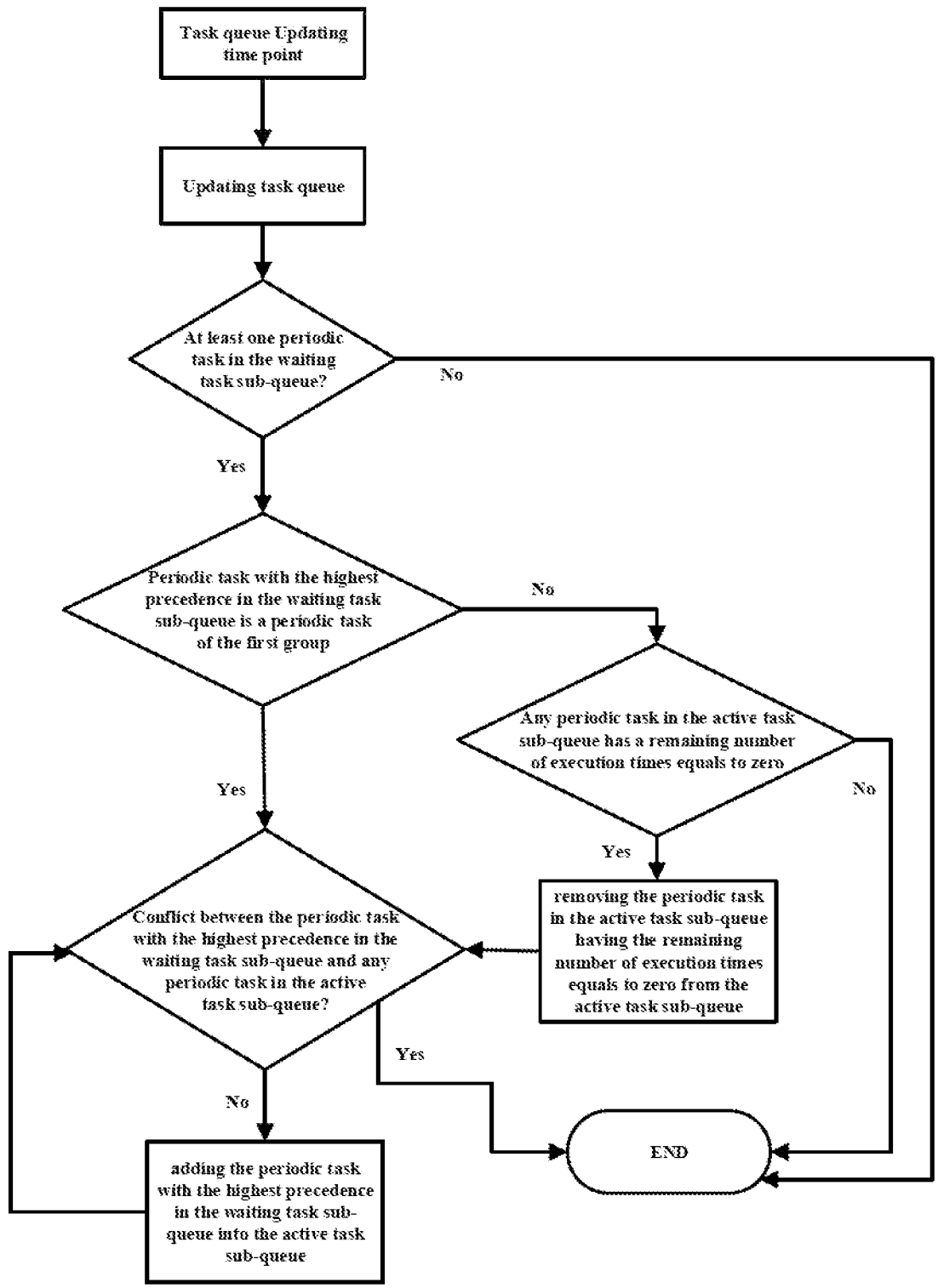
FIG. 5 is a flow chart illustrating a computer-implemented method in some embodiments according to the present disclosure.

In some embodiments, the computer-implemented method includes forming a task queue comprising at least one periodic task, the task queue comprising an active task sub-queue and a waiting task sub-queue; and updating the task queue periodically respectively at scheduled time points. FIG. 5 is a flow chart illustrating a computer-implemented method in some embodiments according to the present disclosure. Referring to FIG. 5, at a respective scheduled time point, updating the task queue includes determining whether there is at least one periodic task in the waiting task sub-queue. Upon a determination that there is no periodic task in the waiting task sub-queue, the updating process ends.

Upon a determination that there is at least one periodic task in the waiting task sub-queue, the computer-implemented method in some embodiments further includes determining whether the periodic task with the highest precedence in the waiting task sub-queue is a periodic task of the first group. Upon a determination that the periodic task with the highest precedence in the waiting task sub-queue is a periodic task of the first group, the computer-implemented method in some embodiments further includes determining whether there is a conflict between the periodic task with the highest precedence in the waiting task sub-queue and any periodic task in the active task sub-queue. Upon a determination no conflict exists between the periodic task with the highest precedence in the waiting task sub-queue and any periodic task in the active task sub-queue, the computer-implemented method in some embodiments further includes adding the periodic task with the highest precedence in the waiting task sub-queue into the active task sub-queue. Upon a determination a conflict exists between the periodic task with the highest precedence in the waiting task sub-queue and any periodic task in the active task sub-queue, the updating process ends.

In some embodiments, subsequent to adding the periodic task with the highest precedence in the waiting task sub-queue into the active task sub-queue, the computer-implemented method in some embodiments further includes reiterating, sequentially one-by-one according to an order of precedence, determining conflict and adding periodic task for remaining periodic tasks in the waiting task sub-queue, until a conflict is determined at which point the updating process ends.

Referring to FIG. 5 again, upon a determination that there is at least one periodic task in the waiting task sub-queue, the computer-implemented method in some embodiments further includes determining whether the periodic task with the highest precedence in the waiting task sub-queue is a periodic task of the second group. Upon a determination that the periodic task with the highest precedence in the waiting task sub-queue is a periodic task of the second group, the computer-implemented method in some embodiments further includes determining whether there is any periodic task in the active task sub-queue having a remaining number of execution times equal to zero. Upon a determination there is a periodic task in the active task sub-queue having the remaining number of execution times equal to zero, the computer-implemented method in some embodiments further includes removing the periodic task in the active task sub-queue having the remaining number of execution times equal to zero from the active task sub-queue. Subsequent to removing the periodic task in the active task sub-queue having the remaining number of execution times equal to zero from the active task sub-queue, the computer-implemented method in some embodiments further includes determining whether there is a conflict between the periodic task with the highest precedence in the waiting task sub-queue and any periodic task remaining in the active task sub-queue. Upon a determination no conflict exists between the periodic task with the highest precedence in the waiting task sub-queue and any periodic task in the active task sub-queue, the computer-implemented method in some embodiments further includes adding the periodic task with the highest precedence in the waiting task sub-queue into the active task sub-queue. Upon a determination a conflict exists between the periodic task with the highest precedence in the waiting task sub-queue and any periodic task in the active task sub-queue, the updating process ends.

In some embodiments, subsequent to adding the periodic task with the highest precedence in the waiting task sub-queue into the active task sub-queue, the computer-implemented method in some embodiments further includes reiterating, sequentially one-by-one according to an order of precedence, determining conflict and adding periodic task for remaining periodic tasks in the waiting task sub-queue, until a conflict is determined at which point the updating process ends.

Referring to FIG. 5 again, upon a determination that there is at least one periodic task in the waiting task sub-queue, the computer-implemented method in some embodiments further includes determining whether the periodic task with the highest precedence in the waiting task sub-queue is a periodic task of the second group. Upon a determination that the periodic task with the highest precedence in the waiting task sub-queue is a periodic task of the second group, the computer-implemented method in some embodiments further includes determining whether there is any periodic task in the active task sub-queue having a remaining number of execution times equal to zero. Upon a determination none of periodic tasks in the active task sub-queue having the remaining number of execution times equal to zero, maintaining the periodic task with the highest precedence in the waiting task sub-queue.

In some embodiments, the computer-implemented method includes determining whether or not there is a conflict between a newly arrived periodic task and one or more existing periodic tasks. Optionally, the computer-implemented method includes determining whether or not there is a conflict between a newly arrived periodic task of the second group and one or more existing periodic tasks of the second group. Optionally, the computer-implemented method includes determining whether or not there is a conflict between a newly arrived periodic task of the second group and one or more existing periodic tasks of the first group. Optionally, the computer-implemented method includes determining whether or not there is a conflict between a newly arrived periodic task of the first group and one or more existing periodic tasks of the second group. Optionally, the computer-implemented method includes determining whether or not there is a conflict between a newly arrived periodic task of the first group and one or more existing periodic tasks of the first group.

In some embodiments, the computer-implemented method includes determining whether or not there is a conflict between a newly arrived periodic task of the second group and one or more existing periodic tasks of the second group. In some embodiments, scheduling execution periods of a respective one of the one or more existing periodic tasks of the second group is expressed as:

$$[(\varphi_i+kT_i),(\varphi_i+kT_i+\tau_i)], k=0,1,2,\ldots,N_i;$$

wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks.

In some embodiments, scheduling execution periods of the newly arrived periodic task of the second group is expressed as:

$$[(\varphi^N+kT^N),(\varphi^N+kT^N+\tau^N)], k=0,1,2,\ldots,N^N;$$

wherein $\varphi^N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task.

In some embodiments, determining whether or not there is a conflict between the newly arrived periodic task of the second group and one or more existing periodic tasks of the second group includes traversing selective values of time slots available between a present time and a starting time point of a last scheduling execution period of any of the one or more existing periodic tasks of the second group, as candidate initial starting time points of the newly arrived periodic task of the second group, to determine whether or not there is any overlap between candidate scheduling execution periods of the newly arrived periodic task of the second group having a respective candidate initial starting time point and scheduling execution periods of any of the one or more existing periodic tasks of the second group.

To reduce computational demand in the traversing process, in some embodiments, the selective values of time slots exclude any value that renders an initial starting time point or a time point at an end time point of first scheduling execution period of the newly arrived periodic task of the second group to be within any scheduling execution period of any of the one or more existing periodic tasks of the second group.

To further reduce computational demand in the traversing process, in some embodiments, the step of determining whether or not there is any overlap includes, upon a determination any candidate scheduling execution period of the newly arrived periodic task of the second group in a present round of traversal is the same as any candidate scheduling execution period of the newly arrived periodic task of the second group in any previous round of traversal, determining there is an overlap in the present round of traversal.

To further reduce computational demand in the traversing process, in some embodiments, any existing periodic task of the second group having an initial starting time point later than an end time point of the newly arrived periodic task of the second group, or an end time point earlier than a candidate initial starting time point of the newly arrived periodic task of the second group is not traversed in a respective round of traversal.

To further reduce computational demand in the traversing process, in some embodiments, a respective round of traversal is terminated once an overlap between a candidate scheduling execution period of the newly arrived periodic task of the second group and a scheduling execution period of one of the one or more existing periodic tasks of the second group is determined for the first time.

In some embodiments, determining whether or not there is a conflict between a newly arrived periodic task of the second group and one or more existing periodic tasks of the first group includes obtaining a minimum common divisor of durations of scheduling execution periods of the one or more existing periodic tasks of the first group, and, limited in a traversing period having a duration twice of the minimum common divisor, traversing selective values of time slots available in traversing period, as candidate initial starting time points of the newly arrived periodic task of the second group, to determine whether or not there is any overlap between candidate scheduling execution periods of the newly arrived periodic task of the second group having a respective candidate initial starting time point and scheduling execution periods of any of the one or more existing periodic tasks of the first group.

In some embodiments, scheduling execution periods of a respective one of the one or more existing periodic tasks of the first group is expressed as:

$$[(\varphi_i+kT_i),(\varphi_i+kT_i+\tau_i)], k=0,1,2,\ldots,N_i;$$

wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks.

scheduling execution periods of the newly arrived periodic task of the second group is expressed as:

$$[(\varphi^N+kT^N),(\varphi^N+kT^N+\tau^N)], k=0,1,2,\ldots,N^N;$$

wherein $\varphi^N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task.

In some embodiments, determining whether or not there is a conflict between a newly arrived periodic task of the second group and one or more existing periodic tasks of the first group includes performing a remainder value calculation to obtain modified scheduling execution periods: $[(\varphi^N+kT^N)\bmod T_i,(\varphi^N+kT^N+\tau^N)\bmod T_i], k=0, 1, 2, \ldots, N^N;$ and using the modified scheduling execution periods for determining the conflict.

In some embodiments, determining whether or not there is a conflict between a newly arrived periodic task of the first group and one or more existing periodic tasks of the second group includes obtaining a minimum common divisor of durations of scheduling execution periods of newly added and existing periodic tasks of the first group; and, limited in a traversing period having a duration twice of the minimum common divisor, traversing selective values of time slots available in traversing period, as candidate initial starting time points of the newly arrived periodic task of the first group, to determine whether or not there is any overlap between candidate scheduling execution periods of the newly arrived periodic task of the first group having a respective candidate initial starting time point and scheduling execution periods of any of the one or more existing periodic tasks of the second group.

In some embodiments, scheduling execution periods of a respective one of the one or more existing periodic tasks of the second group is expressed as:

$$[(\varphi_i+kT_i),(\varphi_i+kT_i+\tau_i)], k=0,1,2,\ldots,N_i;$$

wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks.

scheduling execution periods of the newly arrived periodic task of the first group is expressed as:

$$[(\varphi^N+kT^N),(\varphi^N+kT^N+\tau^N)], k=0,1,2,\ldots,N^N;$$

wherein $\varphi^N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task.

In some embodiments, determining whether or not there is a conflict between a newly arrived periodic task of the first group and one or more existing periodic tasks of the second group includes performing a remainder value calculation to obtain modified scheduling execution periods: $[(\varphi^N+kT^N) \mod T_i, (\varphi^N+kT^N+\tau^N) \mod T_i]$, $k=0, 1, 2, \ldots, N^N$; and using the modified scheduling execution periods for determining the conflict.

In some embodiments, determining whether or not there is a conflict between a newly arrived periodic task of the first group and one or more existing periodic tasks of the first group includes obtaining a minimum common divisor of durations of scheduling execution periods of newly added and existing periodic tasks of the first group; and, limited in a traversing period having a duration of the minimum common divisor, traversing selective values of time slots available in traversing period, as candidate initial starting time points of the newly arrived periodic task of the first group, to determine whether or not there is any overlap between candidate scheduling execution periods of the newly arrived periodic task of the first group having a respective candidate initial starting time point and scheduling execution periods of any of the one or more existing periodic tasks of the first group.

Figure 6:
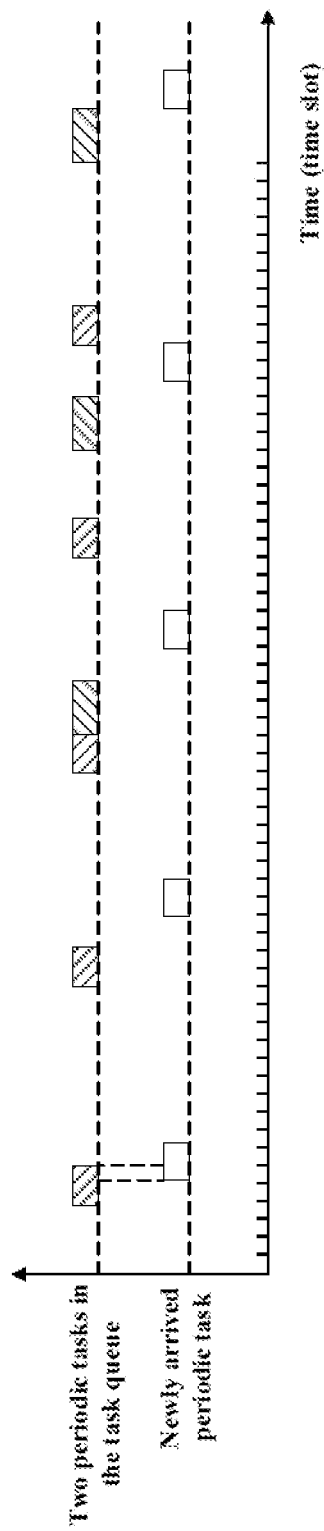
FIG. 6 illustrates an example of scheduling multiple periodic tasks in some embodiments according to the present disclosure.

The present computer-implemented method further introduces a parameter of tolerance. FIG. 6 illustrates an example of scheduling multiple periodic tasks in some embodiments according to the present disclosure. Referring to FIG. 6, in one round of traversing selective values of time slots available as candidate initial starting time points of the newly arrived periodic task, a conflict is found between a newly arrived periodic task and two existing periodic tasks in the task queue. However, as shown in FIG. 6, the overlap between any candidate scheduling execution period of the newly arrived periodic task and a scheduling execution period of any of the existing periodic tasks in the task queue is about 1 time slot. By introducing tolerance, the candidate scheduling execution period that overlaps with the scheduling execution period of the one or more existing periodic tasks can be adjusted to avoid the overlap.

In some embodiments, the computer-implemented method includes determining whether or not there is a conflict between a newly arrived periodic task and one or more existing periodic tasks. In some embodiments, determining the conflict includes traversing selective values of time slots available as candidate initial starting time points of the newly arrived periodic task, to determine whether or not there is any overlap between candidate scheduling execution periods of the newly arrived periodic task having a respective candidate initial starting time point and scheduling execution periods of any of the one or more existing periodic tasks. Optionally, the computer-implemented method further includes, upon a determination that any overlap between any candidate scheduling execution period of the newly arrived periodic task and a scheduling execution period of any of the one or more existing periodic tasks is within a tolerance range, adjusting candidate scheduling execution period that overlaps with the scheduling execution period of the one or more existing periodic tasks so that any overlap is avoided. The tolerance range may be defined to be a relatively small range, such as 1 time slot, 2 time slots, 3 time slots, and so on. Optionally, the tolerance range is less than 5 time slots, e.g., less than 4 time slots, or less than 3 time slots. Optionally, the tolerance range is less than $1/2$ (e.g., less than $1/3$, less than $1/4$, less than $1/5$, less than $1/6$, less than $1/7$, less than $1/8$, less than $1/9$, or less than $1/10$) of the scheduling execution duration at each cycle or the candidate scheduling execution period that overlap with each other.

The present computer-implemented method has several advantages. First, periodic tasks scheduled according to the present computer-implemented method strictly adhere to their respective cycle times. For example, the present computer-implemented method can guarantee a respective periodic task starts execution duration at each cycle strictly at the scheduled time point. Second, the present computer-implemented method does not impose limit or restriction on choice of cycle time and execution duration per cycle of the periodic tasks of the second group (e.g., periodic tasks with limited number of execution times). Third, by introducing the concept of tolerance, task throughput can be improved while still maintaining a strict adherence to scheduled cycle time. Fourth, the present computer-implemented method, when necessary, moves a periodic task of the first group from the active task sub-queue into the waiting task sub-queue, allowing a newly arrived periodic task of the second group to be placed in the active task sub-queue. This unique implementation reduces task scheduling delays.

In another aspect, the present disclosure provides a system comprising one or more processors for executing periodic tasks. In some embodiments, the system comprising one or more processors for executing periodic tasks includes a memory; and one or more processors. The memory and the one or more processors are connected with each other. In some embodiments, the memory stores computer-executable instructions for controlling the one or more processors to classify the periodic tasks into one of at least two groups comprising a first group and a second group. Optionally, cycle times of first periodic tasks in the first group respectively are one or more integer divisors of a maximum cycle time.

Figure 7:
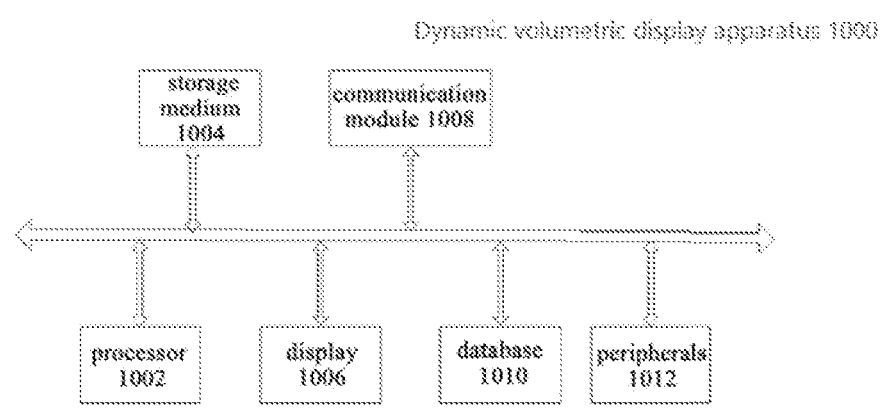
FIG. 7 is a block diagram of a dynamic volumetric display apparatus in some embodiments according to the present disclosure.

FIG. 7 is a block diagram of a dynamic volumetric display apparatus in some embodiments according to the present disclosure. Referring to FIG. 7, in some embodiments, the dynamic volumetric display apparatus 1000 may include any appropriate type of TV, such as a plasma TV, a liquid crystal display (LCD) TV, a touch screen TV, a projection TV, a non-smart TV, a smart TV, etc. The dynamic volumetric display apparatus 1000 may also include other computing systems, such as a personal computer (PC), a tablet or mobile computer, or a smart phone, etc. In addition, the dynamic volumetric display apparatus 1000 may be any appropriate content-presentation device capable of presenting any appropriate content. Users may interact with the dynamic volumetric display apparatus 1000 to perform other activities of interest.

As shown in FIG. 7, the dynamic volumetric display apparatus 1000 may include a processor 1002, a storage medium 1004, a display 1006, a communication module 1008, a database 1010 and peripherals 1012. Certain devices may be omitted and other devices may be included to better describe the relevant embodiments.

The processor 1002 may include any appropriate processor or processors. Further, the processor 1002 may include multiple cores for multi-thread or parallel processing. The processor 1002 may execute sequences of computer program instructions to perform various processes. The storage medium 1004 may include memory modules, such as ROM, RAM, flash memory modules, and mass storages, such as CD-ROM and hard disk, etc. The storage medium 1004 may store computer programs for implementing various processes when the computer programs are executed by the processor 1002. For example, the storage medium 1004 may store computer programs for implementing various algorithms when the computer programs are executed by the processor 1002.

Further, the communication module 1008 may include certain network interface devices for establishing connections through communication networks, such as TV cable network, wireless network, internet, etc. The database 1010 may include one or more databases for storing certain data and for performing certain operations on the stored data, such as database searching.

The display 1006 may provide information to users. The display 1006 may include any appropriate type of computer display device or electronic apparatus display such as LCD or OLED based devices. The peripherals 112 may include various sensors and other I/O devices, such as keyboard and mouse.

It will be understood by one of ordinary skill in the art that all or some of steps of the method, functional modules/units in the system and the device disclosed above may be implemented as software, firmware, hardware, or suitable combinations thereof. In a hardware implementation, a division among functional modules/units mentioned in the above description does not necessarily correspond to the division among physical components. For example, one physical component may have a plurality of functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable storage medium, which may include a computer storage medium (or a non-transitory medium) and a communication medium (or a transitory medium). The term computer storage medium includes volatile and nonvolatile, removable and non-removable media implemented in any method or technology for storage of information, such as computer readable instructions, data structures, program modules or other data, as is well known to one of ordinary skill in the art. A computer storage medium includes, but is not limited to, RAM, ROM, EEPROM, flash memory or other memory technology. CD-ROM, Digital Versatile Disk (DVD) or other optical disk storage, magnetic cassette, magnetic tape, magnetic disk storage or other magnetic storage device, or any other medium which may be used to store desired information and which may accessed by a computer. In addition, a communication medium typically embodies computer readable instructions, data structures, program modules or other data in a modulated data signal such as a carrier wave or other transport mechanism, and includes any information delivery medium, as is well known to one of ordinary skill in the art.

The flowchart and block diagrams in the drawings illustrate architecture, functionality, and operation of possible implementations of a device, a method and a computer program product according to various embodiments of the present disclosure. In this regard, each block in the flowchart or block diagrams may represent a module, program segment(s), or a portion of a code, which includes at least one executable instruction for implementing specified logical function(s). It should also be noted that, in some alternative implementations, functions noted in the blocks may occur out of the order noted in the drawings. For example, two blocks being successively connected may, in fact, be performed substantially concurrently, or the blocks may sometimes be performed in the reverse order, depending upon the functionality involved. It will also be noted that each block of the block diagrams and/or flowchart, and combinations of blocks in the block diagrams and/or flowchart, may be implemented by special purpose hardware-based systems that perform the specified functions or operations, or combinations of special purpose hardware and computer instructions.

In some embodiments, the memory further stores computer-executable instructions for controlling the one or more processors to classify a periodic task into the first group upon a determination that a number of execution times of the periodic task is greater than a minimum number of execution times.

In some embodiments, the memory further stores computer-executable instructions for controlling the one or more processors to classify a periodic task into the second group upon a determination that a number of execution times of the periodic task is equal to or less than a minimum number of execution times.

In some embodiments, the memory further stores computer-executable instructions for controlling the one or more processors to determine whether or not there is a conflict between two periodic tasks. Optionally, the memory further stores computer-executable instructions for controlling the one or more processors to, prior to determining the conflict, determine whether an actual execution duration per cycle of a respective periodic task is an integer multiplier of a minimum time slot; upon a determination that the actual execution duration per cycle of the respective periodic task is not an integer multiplier of the minimum time slot, round up the actual execution duration per cycle to an assigned integer multiplier of the minimum time slot; and assign the assigned integer multiplier as a scheduling execution duration per cycle for purpose of determining the conflict. Optionally, the memory further stores computer-executable instructions for controlling the one or more processors to execute the respective periodic task using the actual execution duration per cycle, and determine the conflict using the scheduling execution duration per cycle.

In some embodiments, the memory further stores computer-executable instructions for controlling the one or more processors to form a task queue comprising at least one periodic task; and assign precedences respectively to periodic tasks in the task queue. Optionally, the task queue comprises an active task sub-queue and a waiting task sub-queue. Optionally, precedences of periodic tasks in the active task sub-queue are higher than precedences of periodic tasks in the waiting task sub-queue. Optionally, precedences of second periodic tasks in the second group are higher than precedences of the first periodic tasks in the first group. Optionally, precedences of periodic tasks in a same sub-queue and in a same group are ranked by priority. Optionally, precedences of periodic tasks in a same sub-queue and in a same group and having a same priority are randomly ranked or ranked by task arriving time points.

In some embodiments, the memory further stores computer-executable instructions for controlling the one or more processors to form a task queue comprising at least one periodic task; and queue a newly arrived periodic task of the first group. Optionally, in order to queue the newly arrived periodic task of the first group, the memory further stores computer-executable instructions for controlling the one or more processors to determine whether or not a conflict exists between the newly arrived periodic task of the first group and any of periodic tasks of the first group in the task queue; and upon a determination the conflict exists between the newly arrived periodic task of the first group and the periodic tasks of the first group in the task queue, exclude a periodic task of the first group having a lowest priority from the task queue.

In some embodiments, the memory further stores computer-executable instructions for controlling the one or more processors to reiterate determining conflict and excluding periodic task until no conflict exists between the newly arrived periodic task of the first group and any of periodic tasks of the first group in the task queue; and add the newly arrived periodic task of the first group into the task queue. Optionally, periodic tasks of the first group in the task queue are ranked by priority.

In some embodiments, the memory further stores computer-executable instructions for controlling the one or more processors to form a task queue comprising at least one periodic task; and queue a newly arrived periodic task of the first group. Optionally, in order to queue the newly arrived periodic task of the first group, the memory further stores computer-executable instructions for controlling the one or more processors to determine whether or not a conflict exists between the newly arrived periodic task of the first group and any of periodic tasks of the first group in the task queue; and upon a determination no conflict exists between the newly arrived periodic task of the first group and any of the periodic tasks of the first group in the task queue, add the newly arrived periodic task of the first group into the task queue. Optionally, periodic tasks of the first group in the task queue are ranked by priority.

In some embodiments, the memory further stores computer-executable instructions for controlling the one or more processors to form a task queue comprising at least one periodic task, the task queue comprising an active task sub-queue and a waiting task sub-queue; and queue a newly arrived periodic task of the second group. Optionally, in order to queue the newly arrived periodic task of the second group, the memory further stores computer-executable instructions for controlling the one or more processors to determine whether or not there is at least one periodic task in the waiting task sub-queue; and upon a determination there is at least one periodic task in the waiting task sub-queue, add the newly arrived periodic task of the second group into the waiting task sub-queue. Optionally, the newly arrived periodic task of the second group added into the waiting task sub-queue is assigned a precedence higher than any periodic task of the first group in the waiting task sub-queue. Optionally, periodic tasks of the second group in the waiting task sub-queue are ranked by priority.

In some embodiments, the memory further stores computer-executable instructions for controlling the one or more processors to form a task queue comprising at least one periodic task, the task queue comprising an active task sub-queue and a waiting task sub-queue; and queue a newly arrived periodic task of the second group. Optionally, in order to queue the newly arrived periodic task of the second group, the memory further stores computer-executable instructions for controlling the one or more processors to determine whether or not there is at least one periodic task in the waiting task sub-queue; upon a determination there is no periodic task in the waiting task sub-queue, determine whether or not a conflict exists between the newly arrived periodic task of the second group and any of periodic tasks in the active task sub-queue; and upon a determination there is no conflict between the newly arrived periodic task of the second group and any of periodic tasks in the active task sub-queue, add the newly arrived periodic task of the second group into the active task sub-queue.

In some embodiments, the memory further stores computer-executable instructions for controlling the one or more processors to form a task queue comprising at least one periodic task, the task queue comprising an active task sub-queue and a waiting task sub-queue; and queue a newly arrived periodic task of the second group. Optionally, in order to queue the newly arrived periodic task of the second group, the memory further stores computer-executable instructions for controlling the one or more processors to determine whether or not there is at least one periodic task in the waiting task sub-queue; and upon a determination there is no periodic task in the waiting task sub-queue, determine whether or not a conflict exists between the newly arrived periodic task of the second group and any of periodic tasks in the active task sub-queue; upon a determination a conflict exists between the newly arrived periodic task of the second group and periodic tasks in the active task sub-queue, determine whether or not there is at least one periodic task of the first group in the active task sub-queue; upon a determination there is at least one periodic task of the first group in the active task sub-queue, move a periodic task of the first group in the active task sub-queue into the waiting task sub-queue; and subsequent to moving the periodic task of the first group in the active task sub-queue into the waiting task sub-queue, determine whether or not a conflict exists between the newly arrived periodic task of the second group and any of periodic tasks remaining in the active task sub-queue.

In some embodiments, the memory further stores computer-executable instructions for controlling the one or more processors to, upon a determination no conflict exists between the newly arrived periodic task of the second group and any of periodic tasks remaining in the active task sub-queue subsequent to moving the periodic task of the first group in the active task sub-queue into the waiting task sub-queue, add the newly arrived periodic task of the second group into the active task sub-queue.

In some embodiments, the memory further stores computer-executable instructions for controlling the one or more processors to, upon a determination there is a conflict between the newly arrived periodic task of the second group and any of periodic tasks remaining in the active task sub-queue subsequent to moving the periodic task of the first group in the active task sub-queue into the waiting task sub-queue, add the newly arrived periodic task of the second group into the waiting task sub-queue.

In some embodiments, the memory further stores computer-executable instructions for controlling the one or more processors to form a task queue comprising at least one periodic task, the task queue comprising an active task sub-queue and a waiting task sub-queue; and update the task queue periodically respectively at scheduled time points. Optionally, at a respective scheduled time point, in order to update the task queue, the memory further stores computer-executable instructions for controlling the one or more processors to determine whether the periodic task with the highest precedence in the waiting task sub-queue is a periodic task of the first group; upon a determination the periodic task with the highest precedence in the waiting task sub-queue is a periodic task of the first group, determine whether there is a conflict between a periodic task with a highest precedence in the waiting task sub-queue and any periodic task in the active task sub-queue; and upon a determination no conflict exists between the periodic task with the highest precedence in the waiting task sub-queue and any periodic task in the active task sub-queue, add the periodic task with the highest precedence in the waiting task sub-queue into the active task sub-queue.

In some embodiments, the memory further stores computer-executable instructions for controlling the one or more processors to form a task queue comprising at least one periodic task, the task queue comprising an active task sub-queue and a waiting task sub-queue; and update the task queue periodically respectively at scheduled time points. Optionally, the periodic task with the highest precedence in the waiting task sub-queue is a periodic task of the second group. Optionally, at a respective scheduled time point, in order to update the task queue, the memory further stores computer-executable instructions for controlling the one or more processors to determine whether the periodic task with the highest precedence in the waiting task sub-queue is a periodic task of the second group; upon a determination the periodic task with the highest precedence in the waiting task sub-queue is a periodic task of the second group, determine whether there is any periodic task in the active task sub-queue having a remaining number of execution times equal to zero; upon a determination there is a periodic task in the active task sub-queue having the remaining number of execution times equal to zero, remove the periodic task in the active task sub-queue having the remaining number of execution times equal to zero from the active task sub-queue; determine whether there is a conflict between the periodic task with the highest precedence in the waiting task sub-queue and any periodic task remaining in the active task sub-queue; and upon a determination no conflict exists between the periodic task with the highest precedence in the waiting task sub-queue and any periodic task in the active task sub-queue, add the periodic task with the highest precedence in the waiting task sub-queue into the active task sub-queue.

In some embodiments, the memory further stores computer-executable instructions for controlling the one or more processors to reiterate, sequentially one-by-one according to an order of precedence, determining conflict and adding periodic task for remaining periodic tasks in the waiting task sub-queue, until a conflict is determined.

In some embodiments, the memory further stores computer-executable instructions for controlling the one or more processors to form a task queue comprising at least one periodic task, the task queue comprising an active task sub-queue and a waiting task sub-queue; and update the task queue periodically respectively at scheduled time points. Optionally, at a respective scheduled time point, in order to update the task queue, the memory further stores computer-executable instructions for controlling the one or more processors to determine whether a periodic task with a highest precedence in the waiting task sub-queue is a periodic task of the second group; upon a determination the periodic task with the highest precedence in the waiting task sub-queue is a periodic task of the second group, determine whether there is any periodic task in the active task sub-queue having a remaining number of execution times equal to zero; and upon a determination none of periodic tasks in the active task sub-queue having the remaining number of execution times equal to zero, maintain the periodic task with the highest precedence in the waiting task sub-queue in the waiting task sub-queue.

In some embodiments, the memory further stores computer-executable instructions for controlling the one or more processors to determine whether or not there is a conflict between a newly arrived periodic task of the second group and one or more existing periodic tasks of the second group. In some embodiments, scheduling execution periods of a respective one of the one or more existing periodic tasks of the second group is expressed as:

$$[(\varphi_i+kT_i),(\varphi_i+kT_i+\tau_i)], k=0,1,2,\ldots,N_i;$$

wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks.

In some embodiments, scheduling execution periods of the newly arrived periodic task of the second group is expressed as:

$$[(\varphi^N+kT^N),(\varphi^N+kT^N+\tau^N)], k=0,1,2,\ldots,N^N;$$

wherein $\varphi^N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task.

In some embodiments, in order to determine the conflict, the memory further stores computer-executable instructions for controlling the one or more processors to traverse selective values of time slots available between a present time and a starting time point of a last scheduling execution period of any of the one or more existing periodic tasks of the second group, as candidate initial starting time points of the newly arrived periodic task of the second group, to determine whether or not there is any overlap between candidate scheduling execution periods of the newly arrived periodic task of the second group having a respective candidate initial starting time point and scheduling execution periods of any of the one or more existing periodic tasks of the second group. Optionally, the selective values of time slots exclude any value that renders an initial starting time point or a time point at an end time point of first scheduling execution period of the newly arrived periodic task of the second group to be within any scheduling execution period of any of the one or more existing periodic tasks of the second group. Optionally, in order to determine whether or not there is any overlap, the memory further stores computer-executable instructions for controlling the one or more processors to, upon a determination any candidate scheduling execution period of the newly arrived periodic task of the second group in a present round of traversal is the same as any candidate scheduling execution period of the newly arrived periodic task of the second group in any previous round of traversal, determine there is an overlap in the present round of traversal. Optionally, any existing periodic task of the second group having an initial starting time point later than an end time point of the newly arrived periodic task of the second group, or an end time point earlier than a candidate initial starting time point of the newly arrived periodic task of the second group is not traversed in a respective round of traversal. Optionally, the memory further stores computer-executable instructions for controlling the one or more processors to terminate a respective round of traversal once an overlap between a candidate scheduling execution period of the newly arrived periodic task of the second group and a scheduling execution period of one of the one or more existing periodic tasks of the second group is determined for the first time.

In some embodiments, the memory further stores computer-executable instructions for controlling the one or more processors to determine whether or not there is a conflict between a newly arrived periodic task of the second group and one or more existing periodic tasks of the first group. Optionally, in order to determine the conflict, the memory further stores computer-executable instructions for controlling the one or more processors to obtain a minimum common divisor of durations of scheduling execution periods of the one or more existing periodic tasks of the first group; and, limited in a traversing period having a duration twice of the minimum common divisor, traverse selective values of time slots available in traversing period, as candidate initial starting time points of the newly arrived periodic task of the second group, to determine whether or not there is any overlap between candidate scheduling execution periods of the newly arrived periodic task of the second group having a respective candidate initial starting time point and scheduling execution periods of any of the one or more existing periodic tasks of the first group.

In some embodiments, the memory further stores computer-executable instructions for controlling the one or more processors to determine whether or not there is a conflict between a newly arrived periodic task of the second group and one or more existing periodic tasks of the first group. In some embodiments, scheduling execution periods of a respective one of the one or more existing periodic tasks of the first group is expressed as:

$$[(\varphi_i+kT_i),(\varphi_i+kT_i+\tau_i)], k=0,1,2,\ldots,N_i;$$

wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks.

scheduling execution periods of the newly arrived periodic task of the second group is expressed as:

$$[(\varphi^N+kT^N),(\varphi^N+kT^N+\tau^N)], k=0,1,2,\ldots,N^N;$$

wherein $\varphi^N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task.

In some embodiments, in order to determine the conflict, the memory further stores computer-executable instructions for controlling the one or more processors to perform a remainder value calculation to obtain modified scheduling execution periods: $[(\varphi^N+kT^N)\bmod T_i,(\varphi^N+kT^N+\tau^N)\bmod T_i]$, $k=0, 1, 2, \ldots, N^N$; and using the modified scheduling execution periods for determining the conflict.

In some embodiments, the memory further stores computer-executable instructions for controlling the one or more processors to determine whether or not there is a conflict between a newly arrived periodic task of the first group and one or more existing periodic tasks of the second group. Optionally, in order to determine the conflict, the memory further stores computer-executable instructions for controlling the one or more processors to obtain a minimum common divisor of durations of scheduling execution periods of newly added and existing periodic tasks of the first group; and, limited in a traversing period having a duration twice of the minimum common divisor, traverse selective values of time slots available in traversing period, as candidate initial starting time points of the newly arrived periodic task of the first group, to determine whether or not there is any overlap between candidate scheduling execution periods of the newly arrived periodic task of the first group having a respective candidate initial starting time point and scheduling execution periods of any of the one or more existing periodic tasks of the second group.

In some embodiments, the memory further stores computer-executable instructions for controlling the one or more processors to determine whether or not there is a conflict between a newly arrived periodic task of the first group and one or more existing periodic tasks of the second group. In some embodiments, scheduling execution periods of a respective one of the one or more existing periodic tasks of the second group is expressed as:

$$[(\varphi_i+kT_i),(\varphi_i+kT_i+\tau_i)], k=0,1,2,\ldots,N_i;$$

wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks.

scheduling execution periods of the newly arrived periodic task of the first group is expressed as:

$$[(\varphi^N+kT^N),(\varphi^N+kT^N+\tau^N)], k=0,1,2,\ldots,N^N;$$

wherein $\varphi^N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task.

In some embodiments, in order to determine the conflict, the memory further stores computer-executable instructions for controlling the one or more processors to perform a remainder value calculation to obtain modified scheduling execution periods: $[(\varphi^N+kT^N)\bmod T_i,(\varphi^N+kT^N+\tau^N)\bmod T_i]$, $k=0, 1, 2, \ldots, N^N$; and using the modified scheduling execution periods for determining the conflict.

In some embodiments, the memory further stores computer-executable instructions for controlling the one or more processors to determine whether or not there is a conflict between a newly arrived periodic task of the first group and one or more existing periodic tasks of the first group. Optionally, in order to determine the conflict, the memory further stores computer-executable instructions for controlling the one or more processors to obtain a minimum common divisor of durations of scheduling execution periods of newly added and existing periodic tasks of the first group; and, limited in a traversing period having a duration of the minimum common divisor, traverse selective values of time slots available in traversing period, as candidate initial starting time points of the newly arrived periodic task of the first group, to determining whether or not there is any overlap between candidate scheduling execution periods of the newly arrived periodic task of the first group having a respective candidate initial starting time point and scheduling execution periods of any of the one or more existing periodic tasks of the first group.

In some embodiments, the memory further stores computer-executable instructions for controlling the one or more processors to determine whether or not there is a conflict between a newly arrived periodic task and one or more existing periodic tasks. Optionally, in order to determine the conflict, the memory further stores computer-executable instructions for controlling the one or more processors to traverse selective values of time slots available as candidate initial starting time points of the newly arrived periodic task, to determine whether or not there is any overlap between candidate scheduling execution periods of the newly arrived periodic task having a respective candidate initial starting time point and scheduling execution periods of any of the one or more existing periodic tasks. In some embodiments, the memory further stores computer-executable instructions for controlling the one or more processors to, upon a determination that any overlap between any candidate scheduling execution period of the newly arrived periodic task and a scheduling execution period of any of the one or more existing periodic tasks is within a tolerance range, adjust candidate scheduling execution period that overlaps with the scheduling execution period of the one or more existing periodic tasks so that any overlap is avoided In another aspect, the present disclosure provides a computer-program product. The computer-program product includes a non-transitory tangible computer-readable medium having computer-readable instructions thereon. In some embodiments, the computer-readable instructions are executable by a processor to cause the processor to perform classifying periodic tasks into one of at least two groups comprising a first group and a second group. Optionally, cycle times of first periodic tasks in the first group respectively are one or more integer divisors of a maximum cycle time.

In some embodiments, the computer-readable instructions are further executable by a processor to cause the processor to perform classifying a periodic task into the first group upon a determination that a number of execution times of the periodic task is greater than a minimum number of execution times.

In some embodiments, the computer-readable instructions are further executable by a processor to cause the processor to perform classifying a periodic task into the second group upon a determination that a number of execution times of the periodic task is equal to or less than a minimum number of execution times.

In some embodiments, the computer-readable instructions are further executable by a processor to cause the processor to perform determining whether or not there is a conflict between two periodic tasks. Optionally, prior to determining the conflict, the computer-readable instructions are further executable by a processor to cause the processor to perform determining whether an actual execution duration per cycle of a respective periodic task is an integer multiplier of a minimum time slot; upon a determination that the actual execution duration per cycle of the respective periodic task is not an integer multiplier of the minimum time slot, rounding up the actual execution duration per cycle to an assigned integer multiplier of the minimum time slot; and assigning the assigned integer multiplier as a scheduling execution duration per cycle for purpose of determining the conflict. Optionally, the actual execution duration per cycle is used for executing the respective periodic task, and the scheduling execution duration per cycle is used for purpose of determining the conflict.

In some embodiments, the computer-readable instructions are further executable by a processor to cause the processor to perform forming a task queue comprising at least one periodic task; and assigning precedences respectively to periodic tasks in the task queue. Optionally, the task queue comprises an active task sub-queue and a waiting task sub-queue. Optionally, precedences of periodic tasks in the active task sub-queue are higher than precedences of periodic tasks in the waiting task sub-queue. Optionally, precedences of second periodic tasks in the second group are higher than precedences of the first periodic tasks in the first group. Optionally, precedences of periodic tasks in a same sub-queue and in a same group are ranked by priority. Optionally, precedences of periodic tasks in a same sub-queue and in a same group and having a same priority are randomly ranked or ranked by task arriving time points.

In some embodiments, the computer-readable instructions are further executable by a processor to cause the processor to perform forming a task queue comprising at least one periodic task; and queueing a newly arrived periodic task of the first group. Optionally, in order to queue the newly arrived periodic task of the first group, the computer-readable instructions are further executable by a processor to cause the processor to perform determining whether or not a conflict exists between the newly arrived periodic task of the first group and any of periodic tasks of the first group in the task queue, and upon a determination the conflict exists between the newly arrived periodic task of the first group and the periodic tasks of the first group in the task queue, excluding a periodic task of the first group having a lowest priority from the task queue.

In some embodiments, the computer-readable instructions are further executable by a processor to cause the processor to perform reiterating determining conflict and excluding periodic task until no conflict exists between the newly arrived periodic task of the first group and any of periodic tasks of the first group in the task queue; and adding the newly arrived periodic task of the first group into the task queue. Optionally, periodic tasks of the first group in the task queue are ranked by priority.

In some embodiments, the computer-readable instructions are further executable by a processor to cause the processor to perform forming a task queue comprising at least one periodic task; and queueing a newly arrived periodic task of the first group. Optionally, in order to queue the newly arrived periodic task of the first group, the computer-readable instructions are further executable by a processor to cause the processor to perform determining whether or not a conflict exists between the newly arrived periodic task of the first group and any of periodic tasks of the first group in the task queue; and upon a determination no conflict exists between the newly arrived periodic task of the first group and any of the periodic tasks of the first group in the task queue, adding the newly arrived periodic task of the first group into the task queue. Optionally, periodic tasks of the first group in the task queue are ranked by priority.

In some embodiments, the computer-readable instructions are further executable by a processor to cause the processor to perform forming a task queue comprising at least one periodic task, the task queue comprising an active task sub-queue and a waiting task sub-queue; and queueing a newly arrived periodic task of the second group. Optionally, in order to queue the newly arrived periodic task of the second group, the computer-readable instructions are further executable by a processor to cause the processor to perform determining whether or not there is at least one periodic task in the waiting task sub-queue; and upon a determination there is at least one periodic task in the waiting task sub-queue, adding the newly arrived periodic task of the second group into the waiting task sub-queue.

In some embodiments, the computer-readable instructions are further executable by a processor to cause the processor to perform assigning the newly arrived periodic task of the second group added into the waiting task sub-queue a precedence higher than any periodic task of the first group in the waiting task sub-queue; and ranking periodic tasks of the second group in the waiting task sub-queue by priority.

In some embodiments, the computer-readable instructions are further executable by a processor to cause the processor to perform forming a task queue comprising at least one periodic task, the task queue comprising an active task sub-queue and a waiting task sub-queue; and queueing a newly arrived periodic task of the second group. Optionally, in order to queue the newly arrived periodic task of the second group, the computer-readable instructions are further executable by a processor to cause the processor to perform determining whether or not there is at least one periodic task in the waiting task sub-queue; upon a determination there is no periodic task in the waiting task sub-queue, determining whether or not a conflict exists between the newly arrived periodic task of the second group and any of periodic tasks in the active task sub-queue; and upon a determination there is no conflict between the newly arrived periodic task of the second group and any of periodic tasks in the active task sub-queue, adding the newly arrived periodic task of the second group into the active task sub-queue.

In some embodiments, the computer-readable instructions are further executable by a processor to cause the processor to perform forming a task queue comprising at least one periodic task, the task queue comprising an active task sub-queue and a waiting task sub-queue; and queueing a newly arrived periodic task of the second group. Optionally, in order to queue the newly arrived periodic task of the second group, the computer-readable instructions are further executable by a processor to cause the processor to perform determining whether or not there is at least one periodic task in the waiting task sub-queue; upon a determination there is no periodic task in the waiting task sub-queue, determining whether or not a conflict exists between the newly arrived periodic task of the second group and any of periodic tasks in the active task sub-queue; upon a determination a conflict exists between the newly arrived periodic task of the second group and periodic tasks in the active task sub-queue, determining whether or not there is at least one periodic task of the first group in the active task sub-queue; upon a determination there is at least one periodic task of the first group in the active task sub-queue, moving a periodic task of the first group in the active task sub-queue into the waiting task sub-queue; and subsequent to moving the periodic task of the first group in the active task sub-queue into the waiting task sub-queue, determining whether or not a conflict exists between the newly arrived periodic task of the second group and any of periodic tasks remaining in the active task sub-queue.

In some embodiments, the computer-readable instructions are further executable by a processor to cause the processor to perform, upon a determination no conflict exists between the newly arrived periodic task of the second group and any of periodic tasks remaining in the active task sub-queue subsequent to moving the periodic task of the first group in the active task sub-queue into the waiting task sub-queue, adding the newly arrived periodic task of the second group into the active task sub-queue.

In some embodiments, the computer-readable instructions are further executable by a processor to cause the processor to perform, upon a determination there is a conflict between the newly arrived periodic task of the second group and any of periodic tasks remaining in the active task sub-queue subsequent to moving the periodic task of the first group in the active task sub-queue into the waiting task sub-queue, adding the newly arrived periodic task of the second group into the waiting task sub-queue.

In some embodiments, the computer-readable instructions are further executable by a processor to cause the processor to perform forming a task queue comprising at least one periodic task, the task queue comprising an active task sub-queue and a waiting task sub-queue; and updating the task queue periodically respectively at scheduled time points. Optionally, at a respective scheduled time point, in order to update the task queue, the computer-readable instructions are further executable by a processor to cause the processor to perform determining whether the periodic task with the highest precedence in the waiting task sub-queue is a periodic task of the first group; upon a determination the periodic task with the highest precedence in the waiting task sub-queue is a periodic task of the first group, determining whether there is a conflict between a periodic task with a highest precedence in the waiting task sub-queue and any periodic task in the active task sub-queue; and upon a determination no conflict exists between the periodic task with the highest precedence in the waiting task sub-queue and any periodic task in the active task sub-queue, adding the periodic task with the highest precedence in the waiting task sub-queue into the active task sub-queue.

In some embodiments, the computer-readable instructions are further executable by a processor to cause the processor to perform forming a task queue comprising at least one periodic task, the task queue comprising an active task sub-queue and a waiting task sub-queue; and updating the task queue periodically respectively at scheduled time points. Optionally, the periodic task with the highest precedence in the waiting task sub-queue is a periodic task of the second group. Optionally, at a respective scheduled time point, in order to update the task queue, the computer-readable instructions are further executable by a processor to cause the processor to perform determining whether the periodic task with the highest precedence in the waiting task sub-queue is a periodic task of the second group; upon a determination the periodic task with the highest precedence in the waiting task sub-queue is a periodic task of the second group, determining whether there is any periodic task in the active task sub-queue having a remaining number of execution times equal to zero; upon a determination there is a periodic task in the active task sub-queue having the remaining number of execution times equal to zero, removing the periodic task in the active task sub-queue having the remaining number of execution times equal to zero from the active task sub-queue; determining whether there is a conflict between the periodic task with the highest precedence in the waiting task sub-queue and any periodic task remaining in the active task sub-queue; and upon a determination no conflict exists between the periodic task with the highest precedence in the waiting task sub-queue and any periodic task in the active task sub-queue, adding the periodic task with the highest precedence in the waiting task sub-queue into the active task sub-queue.

In some embodiments, the computer-readable instructions are further executable by a processor to cause the processor to perform reiterating, sequentially one-by-one according to an order of precedence, determining conflict and adding periodic task for remaining periodic tasks in the waiting task sub-queue, until a conflict is determined.

In some embodiments, the computer-readable instructions are further executable by a processor to cause the processor to perform forming a task queue comprising at least one periodic task, the task queue comprising an active task sub-queue and a waiting task sub-queue; and updating the task queue periodically respectively at scheduled time points. Optionally, at a respective scheduled time point, in order to update the task queue, the computer-readable instructions are further executable by a processor to cause the processor to perform determining whether a periodic task with a highest precedence in the waiting task sub-queue is a periodic task of the second group; upon a determination the periodic task with the highest precedence in the waiting task sub-queue is a periodic task of the second group, determining whether there is any periodic task in the active task sub-queue having a remaining number of execution times equal to zero; and upon a determination none of periodic tasks in the active task sub-queue having the remaining number of execution times equal to zero, maintaining the periodic task with the highest precedence in the waiting task sub-queue in the waiting task sub-queue.

In some embodiments, the computer-readable instructions are further executable by a processor to cause the processor to perform determining whether or not there is a conflict between a newly arrived periodic task of the second group and one or more existing periodic tasks of the second group. In some embodiments, scheduling execution periods of a respective one of the one or more existing periodic tasks of the second group is expressed as:

$$[(\varphi_i+kT_i),(\varphi_i+kT_i+\tau_i)], k=0,1,2,\ldots,N_i;$$

wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks.

In some embodiments, scheduling execution periods of the newly arrived periodic task of the second group is expressed as:

$$[(\varphi^N+kT^N),(\varphi^N+kT^N+\tau^N)], k=0,1,2,\ldots,N^N;$$

wherein $\varphi^N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task.

In some embodiments, in order to determine the conflict, the computer-readable instructions are further executable by a processor to cause the processor to perform traversing selective values of time slots available between a present time and a starting time point of a last scheduling execution period of any of the one or more existing periodic tasks of the second group, as candidate initial starting time points of the newly arrived periodic task of the second group, to determining whether or not there is any overlap between candidate scheduling execution periods of the newly arrived periodic task of the second group having a respective candidate initial starting time point and scheduling execution periods of any of the one or more existing periodic tasks of the second group. Optionally, the selective values of time slots exclude any value that renders an initial starting time point or a time point at an end time point of first scheduling execution period of the newly arrived periodic task of the second group to be within any scheduling execution period of any of the one or more existing periodic tasks of the second group. Optionally, determining whether or not there is any overlap comprises, upon a determination any candidate scheduling execution period of the newly arrived periodic task of the second group in a present round of traversal is the same as any candidate scheduling execution period of the newly arrived periodic task of the second group in any previous round of traversal, determining there is an overlap in the present round of traversal. Optionally, any existing periodic task of the second group having an initial starting time point later than an end time point of the newly arrived periodic task of the second group, or an end time point earlier than an candidate initial starting time point of the newly arrived periodic task of the second group is not traversed in a respective round of traversal. Optionally, a respective round of traversal is terminated once an overlap between a candidate scheduling execution period of the newly arrived periodic task of the second group and a scheduling execution period of one of the one or more existing periodic tasks of the second group is determined for the first time.

In some embodiments, the computer-readable instructions are further executable by a processor to cause the processor to perform determining whether or not there is a conflict between a newly arrived periodic task of the second group and one or more existing periodic tasks of the first group. Optionally, in order to update the task queue, the computer-readable instructions are further executable by a processor to cause the processor to perform obtaining a minimum common divisor of durations of scheduling execution periods of the one or more existing periodic tasks of the first group; and, limited in a traversing period having a duration twice of the minimum common divisor, traversing selective values of time slots available in traversing period, as candidate initial starting time points of the newly arrived periodic task of the second group, to determining whether or not there is any overlap between candidate scheduling execution periods of the newly arrived periodic task of the second group having a respective candidate initial starting time point and scheduling execution periods of any of the one or more existing periodic tasks of the first group.

In some embodiments, the computer-readable instructions are further executable by a processor to cause the processor to perform determining whether or not there is a conflict between a newly arrived periodic task of the second group and one or more existing periodic tasks of the first group. In some embodiments, scheduling execution periods of a respective one of the one or more existing periodic tasks of the first group is expressed as:

$$[(\varphi_i+kT_i),(\varphi_i+kT_i+\tau_i)], k=0,1,2,\ldots,N_i;$$

wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks.

scheduling execution periods of the newly arrived periodic task of the second group is expressed as:

$$[(\varphi^N+kT^N),(\varphi^N+kT^N+\tau^N)], k=0,1,2,\ldots,N^N;$$

wherein $\varphi^N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task.

In some embodiments, in order to determine the conflict, the computer-readable instructions are further executable by a processor to cause the processor to perform a remainder value calculation to obtain modified scheduling execution periods: $[(\varphi^N+kT^N) \bmod T_i, (\varphi^N+kT^N+\tau^N) \bmod T_i]$, $k=0, 1, 2, \ldots, N^N$; and using the modified scheduling execution periods for determining the conflict.

In some embodiments, the computer-readable instructions are further executable by a processor to cause the processor to perform determining whether or not there is a conflict between a newly arrived periodic task of the first group and one or more existing periodic tasks of the second group. Optionally, in order to determine the conflict, the computer-readable instructions are further executable by a processor to cause the processor to perform obtaining a minimum common divisor of durations of scheduling execution periods of newly added and existing periodic tasks of the first group; and, limited in a traversing period having a duration twice of the minimum common divisor, traversing selective values of time slots available in traversing period, as candidate initial starting time points of the newly arrived periodic task of the first group, to determining whether or not there is any overlap between candidate scheduling execution periods of the newly arrived periodic task of the first group having a respective candidate initial starting time point and scheduling execution periods of any of the one or more existing periodic tasks of the second group.

In some embodiments, the computer-readable instructions are further executable by a processor to cause the processor to perform determining whether or not there is a conflict between a newly arrived periodic task of the first group and one or more existing periodic tasks of the second group. In some embodiments, scheduling execution periods of a respective one of the one or more existing periodic tasks of the second group is expressed as:

$$[(\varphi_i+kT_i),(\varphi_i+kT_i+\tau_i)], k=0,1,2,\ldots,N_i;$$

wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks.

scheduling execution periods of the newly arrived periodic task of the first group is expressed as:

$$[(\varphi^N+kT^N),(\varphi^N+kT^N+\tau^N)], k=0,1,2,\ldots,N^N;$$

wherein $\varphi^N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task.

In some embodiments, in order to determine the conflict, the computer-readable instructions are further executable by a processor to cause the processor to perform a remainder value calculation to obtain modified scheduling execution periods: $[(\varphi^N+kT^N) \bmod T_i, (\varphi^N+kT^N+\tau^N) \bmod T_i]$, $k=0, 1, 2, \ldots, N^N$; and using the modified scheduling execution periods for determining the conflict.

In some embodiments, the computer-readable instructions are further executable by a processor to cause the processor to perform determining whether or not there is a conflict between a newly arrived periodic task of the first group and one or more existing periodic tasks of the first group. Optionally, in order to determine the conflict, the computer-readable instructions are further executable by a processor to cause the processor to perform obtaining a minimum common divisor of durations of scheduling execution periods of newly added and existing periodic tasks of the first group; and, limited in a traversing period having a duration of the minimum common divisor, traversing selective values of time slots available in traversing period, as candidate initial starting time points of the newly arrived periodic task of the first group, to determining whether or not there is any overlap between candidate scheduling execution periods of the newly arrived periodic task of the first group having a respective candidate initial starting time point and scheduling execution periods of any of the one or more existing periodic tasks of the first group.

In some embodiments, the computer-readable instructions are further executable by a processor to cause the processor to perform determining whether or not there is a conflict between a newly arrived periodic task and one or more existing periodic tasks. Optionally, in order to determine the conflict, the computer-readable instructions are further executable by a processor to cause the processor to perform traversing selective values of time slots available as candidate initial starting time points of the newly arrived periodic task, to determining whether or not there is any overlap between candidate scheduling execution periods of the newly arrived periodic task having a respective candidate initial starting time point and scheduling execution periods of any of the one or more existing periodic tasks. In some embodiments, the computer-readable instructions are further executable by a processor to cause the processor to perform, upon a determination that any overlap between any candidate scheduling execution period of the newly arrived periodic task and a scheduling execution period of any of the one or more existing periodic tasks is within a tolerance range, adjusting candidate scheduling execution period that overlaps with the scheduling execution period of the one or more existing periodic tasks so that any overlap is avoided.

Various illustrative operations described in connection with the configurations disclosed herein may be implemented as electronic hardware, computer software, or combinations of both. Such operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method in a system comprising one or more processors for executing periodic tasks, comprising:
   classifying the periodic tasks into one of at least two groups comprising a first group and a second group;
   forming a task queue comprising at least one periodic task; and
   queueing a newly arrived periodic task of the first group;
   wherein cycle times of first periodic tasks in the first group respectively are one or more integer divisors of a maximum cycle time;
   wherein queueing the newly arrived periodic task of the first group comprises:
   determining whether or not a conflict exists between the newly arrived periodic task of the first group and any of periodic tasks of the first group in the task queue; and
   upon a determination the conflict exists between the newly arrived periodic task of the first group and the periodic tasks of the first group in the task queue, excluding a periodic task of the first group having a lowest priority from the task queue.

2. The computer-implemented method of claim 1, wherein classifying the periodic tasks comprises:
   classifying a periodic task into the first group upon a determination that a number of execution times of the periodic task is greater than a minimum number of execution times.

3. The computer-implemented method of claim 1, wherein classifying the periodic tasks comprises:
   classifying a periodic task into the second group upon a determination that a number of execution times of the periodic task is equal to or less than a minimum number of execution times.

4. The computer-implemented method of claim 1, further comprising determining whether or not there is a conflict between two periodic tasks;
   wherein, prior to determining the conflict, the computer-implemented method further comprises:
   determining whether an actual execution duration per cycle of a respective periodic task is an integer multiplier of a minimum time slot;
   upon a determination that the actual execution duration per cycle of the respective periodic task is not an integer multiplier of the minimum time slot, rounding up the actual execution duration per cycle to an assigned integer multiplier of the minimum time slot; and
   assigning the assigned integer multiplier as a scheduling execution duration per cycle for purpose of determining the conflict;
   wherein the actual execution duration per cycle is used for executing the respective periodic task, and the scheduling execution duration per cycle is used for purpose of determining the conflict.

5. The computer-implemented method of claim 1, further comprising:
   forming a task queue comprising at least one periodic task; and
   assigning precedences respectively to periodic tasks in the task queue;
   wherein the task queue comprises an active task sub-queue and a waiting task sub-queue;
   precedences of periodic tasks in the active task sub-queue are higher than precedences of periodic tasks in the waiting task sub-queue;
   precedences of second periodic tasks in the second group are higher than precedences of the first periodic tasks in the first group; and
   precedences of periodic tasks in a same sub-queue and in a same group are ranked by priority.

6. The computer-implemented method of claim 1, further comprising:
   forming a task queue comprising at least one periodic task; and
   queueing a newly arrived periodic task of the first group;
   wherein queueing the newly arrived periodic task of the first group comprises:

determining whether or not a conflict exists between the newly arrived periodic task of the first group and any of periodic tasks of the first group in the task queue; and upon a determination no conflict exists between the newly arrived periodic task of the first group and any of the periodic tasks of the first group in the task queue, adding the newly arrived periodic task of the first group into the task queue;

wherein periodic tasks of the first group in the task queue are ranked by priority.

7. The computer-implemented method of claim 1, further comprising:

forming a task queue comprising at least one periodic task, the task queue comprising an active task sub-queue and a waiting task sub-queue; and queueing a newly arrived periodic task of the second group;

wherein queueing the newly arrived periodic task of the second group comprises:

determining whether or not there is at least one periodic task in the waiting task sub-queue; and upon a determination there is at least one periodic task in the waiting task sub-queue, adding the newly arrived periodic task of the second group into the waiting task sub-queue.

8. The computer-implemented method of claim 1, further comprising:

forming a task queue comprising at least one periodic task, the task queue comprising an active task sub-queue and a waiting task sub-queue; and queueing a newly arrived periodic task of the second group;

wherein queueing the newly arrived periodic task of the second group comprises:

determining whether or not there is at least one periodic task in the waiting task sub-queue;

upon a determination there is no periodic task in the waiting task sub-queue, determining whether or not a conflict exists between the newly arrived periodic task of the second group and any of periodic tasks in the active task sub-queue; and upon a determination there is no conflict between the newly arrived periodic task of the second group and any of periodic tasks in the active task sub-queue, adding the newly arrived periodic task of the second group into the active task sub-queue.

9. The computer-implemented method of claim 1, further comprising:

forming a task queue comprising at least one periodic task, the task queue comprising an active task sub-queue and a waiting task sub-queue; and queueing a newly arrived periodic task of the second group;

wherein queueing the newly arrived periodic task of the second group comprises:

determining whether or not there is at least one periodic task in the waiting task sub-queue;

upon a determination there is no periodic task in the waiting task sub-queue, determining whether or not a conflict exists between the newly arrived periodic task of the second group and any of periodic tasks in the active task sub-queue;

upon a determination a conflict exists between the newly arrived periodic task of the second group and periodic tasks in the active task sub-queue, determining whether or not there is at least one periodic task of the first group in the active task sub-queue;

upon a determination there is at least one periodic task of the first group in the active task sub-queue, moving a periodic task of the first group in the active task sub-queue into the waiting task sub-queue; and subsequent to moving the periodic task of the first group in the active task sub-queue into the waiting task sub-queue, determining whether or not a conflict exists between the newly arrived periodic task of the second group and any of periodic tasks remaining in the active task sub-queue.

10. The computer-implemented method of claim 1, further comprising:

forming a task queue comprising at least one periodic task, the task queue comprising an active task sub-queue and a waiting task sub-queue; and updating the task queue periodically respectively at scheduled time points;

wherein, at a respective scheduled time point, updating the task queue comprises:

determining whether the periodic task with the highest precedence in the waiting task sub-queue is a periodic task of the first group;

upon a determination the periodic task with the highest precedence in the waiting task sub-queue is a periodic task of the first group, determining whether there is a conflict between a periodic task with a highest precedence in the waiting task sub-queue and any periodic task in the active task sub-queue; and upon a determination no conflict exists between the periodic task with the highest precedence in the waiting task sub-queue and any periodic task in the active task sub-queue, adding the periodic task with the highest precedence in the waiting task sub-queue into the active task sub-queue.

11. The computer-implemented method of claim 1, further comprising:

forming a task queue comprising at least one periodic task, the task queue comprising an active task sub-queue and a waiting task sub-queue; and updating the task queue periodically respectively at scheduled time points;

wherein the periodic task with the highest precedence in the waiting task sub-queue is a periodic task of the second group;

wherein, at a respective scheduled time point, updating the task queue comprises:

determining whether the periodic task with the highest precedence in the waiting task sub-queue is a periodic task of the second group;

upon a determination the periodic task with the highest precedence in the waiting task sub-queue is a periodic task of the second group, determining whether there is any periodic task in the active task sub-queue has a remaining number of execution times equals to zero;

upon a determination there is a periodic task in the active task sub-queue having the remaining number of execution times equals to zero, removing the periodic task in the active task sub-queue having the remaining number of execution times equals to zero from the active task sub-queue;

determining whether there is a conflict between the periodic task with the highest precedence in the waiting task sub-queue and any periodic task remaining in the active task sub-queue; and upon a determination no conflict exists between the periodic task with the highest precedence in the waiting task sub-queue and any periodic task in the active task sub-queue, adding the periodic task with the highest precedence in the waiting task sub-queue into the active task sub-queue.

12. The computer-implemented method of claim 1, further comprising:
forming a task queue comprising at least one periodic task, the task queue comprising an active task sub-queue and a waiting task sub-queue; and
updating the task queue periodically respectively at scheduled time points;
wherein, at a respective scheduled time point, updating the task queue comprises:
determining whether a periodic task with a highest precedence in the waiting task sub-queue is a periodic task of the second group;
upon a determination the periodic task with the highest precedence in the waiting task sub-queue is a periodic task of the second group, determining whether there is any periodic task in the active task sub-queue has a remaining number of execution times equals to zero; and
upon a determination none of periodic tasks in the active task sub-queue having the remaining number of execution times equals to zero, maintaining the periodic task with the highest precedence in the waiting task sub-queue in the waiting task sub-queue.

13. The computer-implemented method of claim 1, further comprising determining whether or not there is a conflict between a newly arrived periodic task of the second group and one or more existing periodic tasks of the second group;
wherein determining the conflict comprises:
traversing selective values of time slots available between a present time and a starting time point of a last scheduling execution period of any of the one or more existing periodic tasks of the second group, as candidate initial starting time points of the newly arrived periodic task of the second group, to determine whether or not there is any overlap between candidate scheduling execution periods of the newly arrived periodic task of the second group having a respective candidate initial starting time point and scheduling execution periods of any of the one or more existing periodic tasks of the second group;
wherein the selective values of time slots exclude any value that renders an initial starting time point or a time point at an end time point of first scheduling execution period of the newly arrived periodic task of the second group to be within any scheduling execution period of any of the one or more existing periodic tasks of the second group;
wherein determining whether or not there is any overlap comprises, upon a determination any candidate scheduling execution period of the newly arrived periodic task of the second group in a present round of traversal is the same as any candidate scheduling execution period of the newly arrived periodic task of the second group in any previous round of traversal, determining there is an overlap in the present round of traversal;
wherein any existing periodic task of the second group having an initial starting time point later than an end time point of the newly arrived periodic task of the second group, or an end time point earlier than a candidate initial starting time point of the newly arrived periodic task of the second group is not traversed in a respective round of traversal; and wherein a respective round of traversal is terminated once an overlap between a candidate scheduling execution period of the newly arrived periodic task of the second group and a scheduling execution period of one of the one or more existing periodic tasks of the second group is determined for the first time.

14. The computer-implemented method of claim 1, further comprising determining whether or not there is a conflict between a newly arrived periodic task of the second group and one or more existing periodic tasks of the first group;
wherein determining the conflict comprises:
obtaining a minimum common divisor of durations of scheduling execution periods of the one or more existing periodic tasks of the first group; and
limited in a traversing period having a duration twice of the minimum common divisor, traversing selective values of time slots available in traversing period, as candidate initial starting time points of the newly arrived periodic task of the second group, to determine whether or not there is any overlap between candidate scheduling execution periods of the newly arrived periodic task of the second group having a respective candidate initial starting time point and scheduling execution periods of any of the one or more existing periodic tasks of the first group.

15. The computer-implemented method of claim 1, further comprising determining whether or not there is a conflict between a newly arrived periodic task of the second group and one or more existing periodic tasks of the first group;
wherein scheduling execution periods of a respective one of the one or more existing periodic tasks of the first group is expressed as:

$$[(\varphi_i+kT_i),(\varphi_i+kT_i+\tau_i)], k=0,1,2,\ldots,N_i;$$

wherein $\varphi_i$ stands for an initial starting time period, before a first scheduling execution period starts, of the respective one of the one or more existing periodic tasks, Ti stands for a cycle time of the respective one of the one or more existing periodic tasks, ti stands for a scheduling execution duration per cycle of the respective one of the one or more existing periodic tasks, and Ni stands for a maximum number of execution times of the respective one of the one or more existing periodic tasks;
wherein scheduling execution periods of the newly arrived periodic task of the second group is expressed as:

$$[(\varphi^N+kT^N),(\varphi^N+kT^N+\tau^N)], k=0,1,2,\ldots,N^N;$$

wherein $\varphi^N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task;
wherein determining the conflict comprises:
performing a remainder value calculation to obtain modified scheduling execution periods:

$$[(\varphi^N+kT^N)\bmod T_i,(\varphi^N+kT^N+\tau^N)\bmod T_i], k=0,1,2,\ldots,N^N; \text{ and}$$

using the modified scheduling execution periods for determining the conflict.

16. The computer-implemented method of claim 1, further comprising determining whether or not there is a conflict between a newly arrived periodic task of the first group and one or more existing periodic tasks of the second group;
wherein determining the conflict comprises:
obtaining a minimum common divisor of durations of scheduling execution periods of newly added and existing periodic tasks of the first group; and
limited in a traversing period having a duration twice of the minimum common divisor, traversing selective values of time slots available in traversing period, as candidate initial starting time points of the newly arrived periodic task of the first group, to determine whether or not there is any overlap between candidate scheduling execution periods of the newly arrived periodic task of the first group having a respective candidate initial starting time point and scheduling execution periods of any of the one or more existing periodic tasks of the second group.

17. The computer-implemented method of claim 1, further comprising determining whether or not there is a conflict between a newly arrived periodic task of the first group and one or more existing periodic tasks of the second group;
wherein scheduling execution periods of a respective one of the one or more existing periodic tasks of the second group is expressed as:

$$[(\varphi_i+kT_i),(\varphi_i+kT_i+\tau_i)], k=0,1,2,\ldots,N_i;$$

wherein $\varphi_i$ stands for an initial starting time period, before a first scheduling execution period starts, of the respective one of the one or more existing periodic tasks, $T_i$ stands for a cycle time of the respective one of the one or more existing periodic tasks, $\tau_i$ stands for a scheduling execution duration per cycle of the respective one of the one or more existing periodic tasks, and $N_i$ stands for a maximum number of execution times of the respective one of the one or more existing periodic tasks;
wherein scheduling execution periods of the newly arrived periodic task of the first group is expressed as:

$$[(\varphi^N+kT^N),(\varphi^N+kT^N+\tau^N)], k=0,1,2,\ldots,N^N;$$

wherein $\varphi^N$ stands for an initial starting time period, before a first scheduling execution period starts, of the newly arrived periodic task, $T^N$ stands for a cycle time of the newly arrived periodic task, $\tau^N$ stands for a scheduling execution duration per cycle of the newly arrived periodic task, and $N^N$ stands for a maximum number of execution times of the newly arrived periodic task;
wherein determining the conflict comprises:
performing a remainder value calculation to obtain modified scheduling execution periods:

$$[(\varphi^N+kT^N)\bmod T_i,(\varphi^N+kT^N+\tau^N)\bmod T_i], k=0,1,2,\ldots,N^N; \text{ and}$$

using the modified scheduling execution periods for determining the conflict.

18. A system comprising one or more processors for executing periodic tasks, comprising:
a memory;
one or more processors;
wherein the memory and the one or more processors are connected with each other; and
the memory stores computer-executable instructions for controlling the one or more processors to:
classify the periodic tasks into one of at least two groups comprising a first group and a second group;
form a task queue comprising at least one periodic task; and
queue a newly arrived periodic task of the first group;
wherein cycle times of first periodic tasks in the first group respectively are one or more integer divisors of a maximum cycle time;
wherein, to queue the newly arrived periodic task of the first group, the memory further stores computer-executable instructions for controlling the one or more processors to:
determine whether or not a conflict exists between the newly arrived periodic task of the first group and any of periodic tasks of the first group in the task queue; and
upon a determination the conflict exists between the newly arrived periodic task of the first group and the periodic tasks of the first group in the task queue, exclude a periodic task of the first group having a lowest priority from the task queue.

19. A computer-program product comprising a non-transitory tangible computer-readable medium having computer-readable instructions thereon, the computer-readable instructions being executable by a processor to cause the processor to perform:
classifying periodic tasks into one of at least two groups comprising a first group and a second group;
forming a task queue comprising at least one periodic task; and
queueing a newly arrived periodic task of the first group;
wherein cycle times of first periodic tasks in the first group respectively are one or more integer divisors of a maximum cycle time;
wherein queueing the newly arrived periodic task of the first group comprises:
determining whether or not a conflict exists between the newly arrived periodic task of the first group and any of periodic tasks of the first group in the task queue; and
upon a determination the conflict exists between the newly arrived periodic task of the first group and the periodic tasks of the first group in the task queue, excluding a periodic task of the first group having a lowest priority from the task queue.

* * * * *